United States Patent
Alsaiari et al.

(10) Patent No.: US 12,522,632 B2
(45) Date of Patent: Jan. 13, 2026

(54) METHOD FOR EXTRACTING KERATIN FROM WOOL/NATURAL FIBERS USING IONIC LIQUIDS REINFORCED WITH SONICATION

(71) Applicant: NAJRAN UNIVERSITY, Najran (SA)

(72) Inventors: Mabkhoot Abdullah Alsaiari, Najran (SA); Nawshad Muhammad, Peshawar (PK); Sandleen Feroz, Dunedin (NZ); George Dias, Dunedin (NZ); Saeed A. Alsareii, Najran (SA); Farid A. Harraz, Najran (SA)

(73) Assignee: NAJRAN UNIVERSITY, Najran (SA)

( * ) Notice: Subject to any disclaimer, the term of this patent is extended or adjusted under 35 U.S.C. 154(b) by 0 days.

(21) Appl. No.: 18/155,457

(22) Filed: Jan. 17, 2023

(65) Prior Publication Data
US 2024/0239837 A1    Jul. 18, 2024

(51) Int. Cl.
*C07K 1/14* (2006.01)
*C07K 14/47* (2006.01)
*D01C 3/00* (2006.01)

(52) U.S. Cl.
CPC ............ *C07K 1/14* (2013.01); *C07K 14/4741* (2013.01); *D01C 3/00* (2013.01)

(58) Field of Classification Search
None
See application file for complete search history.

(56) References Cited

U.S. PATENT DOCUMENTS

2020/0331961 A1    10/2020    Samie et al.

FOREIGN PATENT DOCUMENTS

| CN | 109111516 B | 8/2021 |
| CN | 113307860 A | 8/2021 |
| IN | 201911017481 | 6/2020 |
| WO | 2019/116357 A1 | 6/2019 |

OTHER PUBLICATIONS

Machine translation of CN109111516.*
Majid, Abdul et al; "Isolation and characterization of amorphous solids form oil sands fine tailings." Studies Surf. Sci. Catal (2002) 141 p. 669-674.*
McPherson, Alexander and Gavira, Jose A.; "Introduction to protein crystallization." Acta Crystall. F. (2014) F70 p. 2-20.*
Sinkiewicz, Izabela et al; "Alternative methods of preparation of soluble keratin from chicken feathers." Waste Biomass Valor (2017) 8 p. 1043-1048.*
Lei, Zhigang et al; "Introduction: Ionic liquids." Chem. Rev. (2017) 117 p. 6633-6635.*
Goncalves, Ana R. P. et al; "Ionic liquids—a reivew of their toxicity to living organisms." Int. J. Mol. Sci. (2021) 22(5612).*
The technical data sheet of lanolin from Guinama (2022).*
Feroz, Sandleen et al; "Keratin based materials for biomedical applications." Bioactive Mat. (2020) 5 p. 496-509.*
Pereira, Simone Vieira et al; "Ultrasound influence on the solubiliyt of solid dispersions prepared for a poorly soluble drug." Ultrason. Sonochem. (2016) 29 p. 461-469.*
Ab Rahim, Asyraf Hanim et al; "Probe sonication assisted ionic liquid treatment for rapid dissolution of lignocellulose biomass." Cellulose (2020) 27 p. 2135-2148.*
Llompart, P. et al, "Will we ever be able to accurately predict solubility?" Sci. Data (2024) 11:303.*
Machine translation of CN109111516 (2019).*
Liu, et al. ; The Synthesis of Binary DES and Its Application in the Pretreatment of Wool Keratin Extraction by the L-cysteine Redox Method ; Journal of Natural Fibers ; Dec. 23, 2021 ; Abstract Only ; 2 Pages.
Wang, et al. ; Dissolution of wool in the choline chloride/oxalic acid deep eutectic solvent ; Materials Letters, vol. 231 ; Nov. 15, 2018 ; Abstract Only ; 2 Pages.

* cited by examiner

*Primary Examiner* — Fred H Reynolds
(74) *Attorney, Agent, or Firm* — Oblon, McClelland, Maier & Neustadt, L.L.P.

(57) ABSTRACT

A method for extracting keratin from wool fibers is described. The method includes treating the wool fibers in a solvent, washing, and drying to form cleaned wool fibers. The method incudes cutting the cleaned wool fibers and dispersing in an ionic liquid to form a slurry. The method further includes sonicating the slurry to form a first composition containing dissolved keratin. The method also includes mixing the first composition with water to precipitate the keratin from the first composition. Additionally, the method involves separating and collecting the precipitated keratin from the first composition, washing, and drying to form the keratin. The method for extracting keratin from natural fibers is also described.

13 Claims, 10 Drawing Sheets

METHOD FOR EXTRACTING KERATIN FROM WOOL/NATURAL FIBERS USING IONIC LIQUIDS REINFORCED WITH SONICATION

STATEMENT REGARDING PRIOR DISCLOSURE BY THE INVENTORS

Aspects of this technology are described in an article "Extraction of keratin from sheep wool fibres using aqueous ionic liquids assisted probe sonication technology" published in Journal of Molecular Liquids, Volume 350, 22 Jan. 2022, 118595, which is incorporated herein by reference in its entirety.

BACKGROUND

Technical Field

The present disclosure is directed to molecular liquids, particularly to a method for extracting keratin from wool/natural fibers using ionic liquids reinforced with sonication.

Description of Related Art

The "background" description provided herein is to present the context of the disclosure generally. Work of the presently named inventors, to the extent it is described in this background section, as well as aspects of the description that may not otherwise qualify as prior art at the time of filing, are neither expressly nor impliedly admitted as prior art against the present invention.

Keratin derived from wool has a cysteine content of about 7-13%, differentiating it from other structural proteins such as elastin and collagen [S. Feroz, G. Dias, hydroxypropyl methylcellulose (HPMC) crosslinked keratin/hydroxyapatite (HA) scaffold fabrication, characterization, and in vitro biocompatibility assessment as a bone graft for alveolar bone regeneration, Heliyon. 7 (11) (2021) e08294]. Unlike other natural polymers, the dissolution and extraction of the keratin are mostly time-consuming, complex, and costly. The polypeptide chain of wool keratin has different amino acids containing inter- and intra-molecular bonding of polar and non-polar acids, as well as intramolecular disulfide bonding of cysteine amino acids. The proteins of the wool keratin are also resistant to enzymes such as trypsin, and are insoluble in many organic solvents, alkali solutions, water, etc. Due to the high cysteine content in the wool keratin, it has low solubility and high stability. The cysteine disulfide bonds have an important role in modifying keratin's physical and chemical characteristics. Conventional methods to extract keratin usually require harsh chemical conditions such as reduction, steam explosion, oxidation, microwave irradiation, etc [S. Feroz, G. Dias, HPMC crosslinked keratin/hydroxyapatite (HA) scaffold fabrication, characterization, and in vitro biocompatibility assessment as a bone graft for alveolar bone regeneration, Heliyon. 7 (11) (2021) e08294 and S. Feroz, N. Muhammad, J. Ratnayake, G. Dias, Keratin-Based materials for biomedical applications, Bioact. Mater. 5 (3) (2020) 496-509].

Recently, ionic liquids emerged as a green solvent for applications such as biomass extraction, electrochemistry, and ion conductive media and as catalysts, etc. [M. J. A. Shiddiky, A. A. J. Torriero, Application of ionic liquids in electrochemical sensing systems, Biosens. Bioelectron. 26 (5) (2011) 1775-1787; K. Matsumoto, T. Endo, Synthesis of ion conductive networked polymers based on an ionic liquid epoxide having a quaternary ammonium salt structure, Macromolecules 42 (13) (2009) 4580-4584 and N. Goujon, X. Wang, R. Rajkowa, N. Byrne, Regenerated silk fibroin using protic ionic liquids solvents: towards an all-ionic-liquid process for producing silk with tunable properties, Chem. Commun. 48 (9) (2012) 1278-1280].

They also possess unique physiochemical properties, chemical and thermal stability, low vapor pressure, non-inflammability, high boiling and melting points, ion-conductivity, recyclability, and high solvation ability for some solutes [N. Goujon, X. Wang, R. Rajkowa, N. Byrne, Regenerated silk fibroin using protic ionic liquids solvents: towards an all-ionic-liquid process for producing silk with tunable properties, Chem. Commun. 48 (9) (2012) 1278-1280]. Thermal stability and kinetic studies of benzimidazolium-based ionic liquids show thermal stability up to 330 degrees centigrade (° C.) [Z. Ullah, M. A. Bustam, Z. Man, A. S. Khan, Thermal stability and kinetic study of benzimidazolium based ionic liquid, Procedia Eng. 148 (2016) 215-222]. In addition to all these properties, ionic liquids have been investigated as a solvent for the solubilization of various polymers [W. u. Lan, C.-F. Liu, F.-X. Yue, R.-C. Sun, J. F. Kennedy, Ultrasound-assisted dissolution of cellulose in ionic liquid, Carbohydr. Polym. 86 (2) (2011) 672-677; J. Stanton, Y. e. Xue, P. Pandher, L. Malek, T. Brown, X. Hu, D. Salas-de la Cruz, Impact of ionic liquid type on the structure, morphology, and properties of silk cellulose biocomposite materials, Int. J. Biol. Macromol. 108 (2018) 333-341; S. Ding, Y. Sun, H. Chen, C. Xu, Y. i. Hu, An ultrasonic-ionic liquid process for the efficient acid-catalyzed hydrolysis of feather keratin, Chin. J. Chem. Eng. 27 (3) (2019) 660-667. and J. Iqbal, N. Muhammad, A. Rahim, A. S. Khan, Z. Ullah, G. Gonfa, P. Ahmad, COSMO-RS predictions, hydrogen bond basicity values and experimental evaluation of amino acid-based ionic liquids for lignocellulosic biomass dissolution, J. Mol. Liq. 273 (2019) 215-221]. The use of ionic liquid reduces the need for other toxic volatile organic liquids required in the dissolution of regenerated wool [X. Zhong, R. Li, Z. Wang, W. Wang, D. Yu, Eco-fabrication of the antibacterial nanofibrous membrane with high moisture permeability from wasted wool fabrics, Waste Manage. 102 (2020) 404-411]. A study on the effect of different ionic liquids on dissolving wool fibers was reported [H. Xie, S. Li, S. Zhang, Ionic liquids as novel solvents for the dissolution and blending of wool keratin Fibres, Green Chem. 7 (8) (2005) 606-608]. Several studies were conducted to determine the effect of different ionic liquids on wool fiber dissolution along with other factors like temperature, processing time, and solubility [Y. Ji, J. Chen, J. Lv, Z. Li, L. Xing, S. Ding, Extraction of keratin with ionic liquids from poultry feather, Sep. Purif. Technol. 132 (2014) 577-583 and A. Ghosh, S. Clerens, S. Deb-Choudhury, J. M. Dyer, Thermal effects of ionic liquid dissolution on the structures and properties of regenerated wool keratin, Polym. Degrad. Stab. 108 (2014) 108-115]. Dissolution of feather material using three main ionic liquids [Bmim] Br, [Amim] Cl and [Bmim] Cl. A higher percentage of keratin dissolution for Cl⁻ containing ionic liquids was observed. The feather was used as a sourced material, and 75% keratin yield was reported.

Another study investigated the effects of different temperatures on keratin dissolution. It was reported that the temperature also affects the final yield of the keratin [A. Ghosh, S. Clerens, S. Deb-Choudhury, J. M. Dyer, Thermal effects of ionic liquid dissolution on the structures and properties of regenerated wool keratin, Polym. Degrad. Stab. 108 (2014) 108-115]. However, the keratin extracted at a higher temperature presents a more disrupted structure as compared to the keratin extracted at a lower temperature [A. Ghosh, S. Clerens, S. Deb-Choudhury, J. M. Dyer, Thermal effects of ionic liquid dissolution on the structures and properties of regenerated wool keratin, Polym. Degrad. Stab. 108 (2014) 108-115]. Recently it was shown that 1-propylsulfonic-3-methylimidazolium hydrogensulfate ([PSmim] HSO4) demonstrated a higher potential for wool keratin hydrolysis [keratin from different sources such as feathers and human hair) (X. Li, Z. Guo, J. Li, M. Yang, S. Yao, Swelling and microwave-assisted hydrolysis of animal keratin in ionic liquids, J. Mol. Liq. 341 (2021) 117306).

The use of ionic liquids to extract keratin materials has been plagued by low yield and chemical/physical changes to the keratin. In view of the forgoing, one objective of the present disclosure is to describe a method for extracting keratin from wool fibers. A further objective of the present disclosure is to provide a method for extracting keratin from natural fibers.

SUMMARY

In an exemplary embodiment, a method for extracting keratin from wool fibers is described. The method includes treating the wool fibers in a solvent, washing, and drying to form cleaned wool fibers. The method also includes cutting the cleaned wool fibers and dispersing in an ionic liquid to form a slurry. The method further includes sonicating the slurry to form a first composition containing dissolved keratin. In addition, the method involves mixing the first composition with water to precipitate the keratin from the first composition. Moreover, the method involves separating and collecting the precipitated keratin from the first composition, washing, and drying to form the keratin.

In some embodiments, the ionic liquid includes at least one liquid, and a quaternary hydroxide having a formula (I)

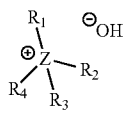

[I]

In some embodiments, Z is nitrogen (N) or phosphine (P).

In some embodiments, $R_1$, $R_2$, $R_3$, and $R_4$ are each independently selected from the group consisting of an optionally substituted alkyl, an optionally substituted benzyl, an optionally substituted aryl.

In some embodiments, the quaternary hydroxide has at least 5 carbons.

In some embodiments, the quaternary hydroxide present in the ionic liquid is in an amount of at least 10 wt. % based on a total weight of the ionic liquid.

In some embodiments, Z is P. In some embodiments, the quaternary hydroxide is at least one selected from the group consisting of tetrabutyl phosphonium hydroxide, tetraphenyl phosphonium hydroxide, methyl triphenyl phosphonium hydroxide, ethyl triphenyl phosphonium hydroxide, propyl triphenyl phosphonium hydroxide, butyl triphenyl phosphonium hydroxide, benzyl triphenyl phosphonium hydroxide, allyl triphenyl phosphonium hydroxide, dodecyl triphenyl phosphonium hydroxide, tetradecyl triphenyl phosphonium hydroxide, hexadecyl triphenyl phosphonium hydroxide, hexadecyl tributyl phosphonium hydroxide, carbethoxyethyl triphenyl phosphonium hydroxide, carbethoxymethyl triphenyl phosphonium hydroxide, and carbmethoxymethyl triphenyl phosphonium hydroxide.

In some embodiments, Z is N. In some further embodiments, the quaternary hydroxide is at least one selected from the group consisting of tetraethylammonium hydroxide, tetrapropylammonium hydroxide, tetrabutylammonium hydroxide, tributylmethylammonium Hydroxide, benzyltrimethylammonium hydroxide, ethyltrimethylammonium hydroxide, choline hydroxide, tris-choline hydroxide, bischoline hydroxide, and diethyldimethylammonium hydroxide.

In some embodiments, at least one liquid is selected from the group consisting of water, methanol, ethanol, propanol, butanol, dimethylformamide, dimethylacetamide, dimethylsulfoxide, tetrahydrofuran, ethyl acetate, 1-formylpiperidine, n-methyl pyrrolidone, and acetonitrile.

In some embodiments, the ionic liquid is at least one selected from the group consisting of a tetrabutylphosphonium hydroxide water solution having a concentration of 30 to 50 percentage weight (wt. %), and a choline hydroxide methanol solution having a concentration of 30 to 50 wt. %, each wt. % based on a total weight of the solution.

In some embodiments, the cleaned wool Fibres are present in the slurry at a concentration of 0.01 to 0.3 gram per milliliters (g/mL) based on a total volume of the ionic liquid.

In some embodiments, the solvent is at least one selected from the group consisting of hexane, cyclohexane, hexanaphthene, toluene, benzene, butane, pentane, octane, nonane, dichloromethane, dichloroethane, chloroform, methanol, ethanol, propanol, butanol, dimethylformamide, dimethylacetamide, dimethylsulfoxide, tetrahydrofuran, and acetonitrile.

In some embodiments, the solvent includes hexane and dichloromethane. In some embodiments, a volume ratio of hexane to dichloromethane in the solvent is in a range of 10:1 to 1:10.

In some embodiments, the sonicating is conducted by a probe sonicator for 5 to 60 minutes. In some embodiments, the slurry temperature is in a range of 30 to 90° C. during the sonicating.

In some embodiments, the probe sonicator is capable of providing sonication energy at from 0.1 to 100 Hertz (Hz).

In some embodiments, a weight percent of the dissolved keratin is at least 50 wt. % based on a total weight of the cleaned wool fibers.

In some embodiments, the keratin extracted from the wool Fibres has an amorphous morphology and an average particle size of less than 1 micrometer (μm).

In some embodiments, the keratin extracted from the wool fibers has a first molecular weight band of about 30 to 80 kilodaltons (KDa), and a second molecular weight band of about 10 to 30 KDa.

In some embodiments, the keratin extracted from the wool fibers have a broad and intense peak at 2-theta (θ) value of 25 to 30° in an X-ray diffraction (XRD) spectrum.

In some embodiments, the keratin extracted from the wool fibers has peaks at 800 to 1100-centimeter inverse (cm$^{-1}$), 1250 to 1700 cm$^{-1}$, and 2700 to 3500 cm$^{-1}$ in a Fourier transform infrared spectrum (FT-IR).

In some embodiments, the keratin extracted from the wool fibers has a higher thermal stability compared to the raw wool fibers.

In another exemplary embodiment, the method for extracting the keratin from natural fibers is described. The method includes treating the natural fibers in a solvent, then washing and drying them to form cleaned natural fibers. The method also involves cutting the cleaned natural fibers and dispersing in an ionic liquid to form a slurry. The method further involves sonicating the slurry to form a first composition containing dissolved keratin. In addition, the method involves mixing the first composition with water to precipitate the keratin from the first composition. Furthermore, the method involves separating and collecting the precipitated keratin from the first composition, washing, and drying to form the keratin.

In some embodiments, the natural fibers are selected from animal fibers, plant fibers, liberian fibers, leaf fibers, metal fibers, and silica fibers.

In some embodiments, the animal fibers are selected from silk, wool, and hair.

The foregoing general description of the illustrative present disclosure and the following The detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
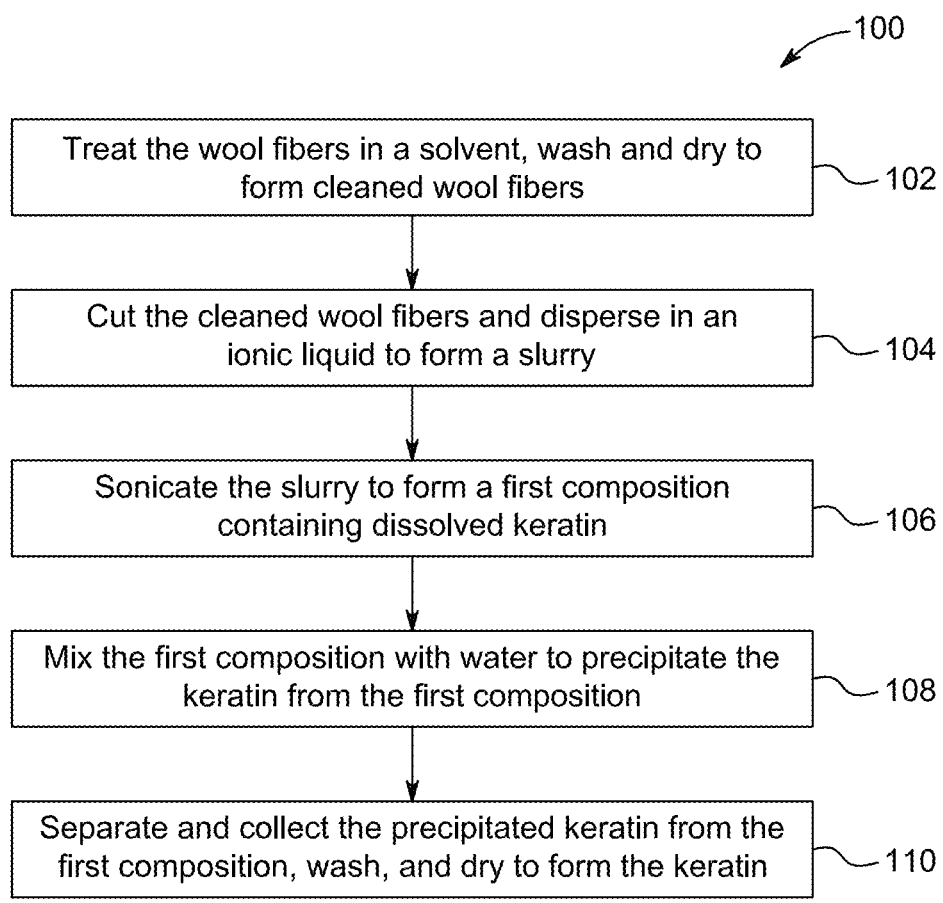
FIG. 1 is a schematic flow diagram of a method for extracting keratin from wool fibers, according to certain embodiments.

In the drawings, reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the term "wool fibers" refers to a textile fiber obtained from sheep and some other animals.

As used herein, the term "solvent" refers to a liquid that can dissolve another substance.

As used herein, the term "sonicating" refers to the process of applying sound energy to agitate particles or discontinuous fibers in a liquid.

As used herein, the term "precipitate" refers to the process of transforming a dissolved substance into an insoluble solid from a super-saturated solution.

Embodiments of the present disclosure are directed to a method for extracting keratin from wool and natural fibers using ionic liquids. The method of the present disclosure discloses the use of ionic liquids, such as tetrabutylphosphonium hydroxide (TBPH) and choline hydroxide (naturally found in animal organs and plants as a constituent of lecithin) for the extraction of the keratin from wool/natural fibers. Unlike the conventional methods of heating and stirring the wool in an ionic liquid, ultrasonic irradiation technology is used in the method of the present disclosure, thereby providing efficient and less energy-intensive processes.

The effect of several parameters such as sonication time, initial loading of the sample, acoustic power, and types of ionic liquid was investigated on the dissolution of wool fibers. The regenerated keratin fibers were characterized to determine their physical, chemical, and thermal properties by various analytical techniques—Fourier electron scanning electron microscope (FE-SEM), Fourier-transform infrared spectroscopy (FTIR), nuclear magnetic resonance (NMR) analysis, and thermogravimetric analysis (TGA). In addition, sodium dodecyl-sulfate polyacrylamide gel electrophoresis (SDS-PAGE) was performed to determine the physiochemical and thermal characteristics of the regenerated material.

Referring to FIG. 1, a schematic flow diagram of the method for extracting keratin from wool fibers is illustrated.

The order in which the method 100 is described is not intended to be construed as a limitation, and any number of the described method steps may be combined in any order to implement the method 100. Additionally, individual steps may be removed or skipped from the method 100 without departing from the spirit and scope of the present disclosure.

At step 102, the method 100 includes treating the wool fibers in a solvent, washing, and drying to form cleaned wool fibers. In some embodiments, the solvent may be polar or non-polar. Suitable examples of non-polar solvents may include but are not limited to, benzene, hexane, pentane, etc. Suitable examples of polar solvents may be water. In some embodiments, the solvent is at least one selected from the group consisting of hexane, cyclohexane, hexanaphthene, toluene, benzene, butane, pentane, octane, nonane, dichloromethane, dichloroethane, chloroform, methanol, ethanol, propanol, butanol, dimethylformamide, dimethylacetamide, dimethylsulfoxide, tetrahydrofuran, and acetonitrile. In a preferred embodiment, a mixture of hexane and dichloromethane is used as the solvent. In a more preferred embodiment, a volume ratio of hexane to dichloromethane in the solvent is in the range of 10:1 to 1:10, preferably 1:8 to 8:1, preferably 1:6 to 6:1, preferably 1:2 to 2:1, or even more preferably about 1:1. The wool fibers are further washed with distilled water, and air dried to obtain the cleaned wool fibers. Other ranges are also possible.

At step 104, the method 100 includes cutting the cleaned wool fibers and dispersing in an ionic liquid to form a slurry. In some embodiments, the cleaned wool fibers are cut into small pieces having an average length of less than 20 centimeters (cm), preferably less than 15 cm, preferably less than 10 cm, preferably less than 5 cm, or even more preferably less than 2 cm. Other ranges are also possible.

In some embodiments, the ionic liquid includes at least one liquid, and a quaternary hydroxide. In some embodiments, the at least one liquid is selected from the group consisting of water, methanol, ethanol, propanol, butanol, dimethylformamide, dimethylacetamide, dimethylsulfoxide, tetrahydrofuran, ethyl acetate, 1-formylpiperidine, n-methyl pyrrolidone, and acetonitrile. In some preferred embodiments, the at least one liquid includes water, methanol, ethanol, and dimethylsulfoxide.

In some embodiments, the quaternary hydroxide is a compound of formula (I)

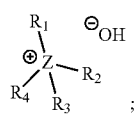

[I]

In one embodiment, Z is nitrogen (N) or phosphine (P). In a preferred embodiment, $R_1$, $R_2$, $R_3$, and $R_4$ are each independently selected from the group consisting of an optionally substituted alkyl, an optionally substituted benzyl, an optionally substituted aryl. In a further preferred embodiment, the quaternary hydroxide has at least 5 carbons. In some embodiments, the Z is P. In one embodiment, the quaternary hydroxide is at least one selected from the group consisting of tetrabutyl phosphonium hydroxide, tetraphenyl phosphonium hydroxide, methyl triphenyl phosphonium hydroxide, ethyl triphenyl phosphonium hydroxide, propyl triphenyl phosphonium hydroxide, butyl triphenyl phosphonium hydroxide, benzyl triphenyl phosphonium hydroxide, allyl triphenyl phosphonium hydroxide, dodecyl triphenyl phosphonium hydroxide, tetradecyl triphenyl phosphonium hydroxide, hexadecyl triphenyl phosphonium hydroxide, hexadecyl tributyl phosphonium hydroxide, carbethoxyethyl triphenyl phosphonium hydroxide, carbmethoxyethyl triphenyl phosphonium hydroxide, carbethoxymethyl triphenyl phosphonium hydroxide, and carbmethoxymethyl triphenyl phosphonium hydroxide.

In some embodiments, the Z is N. In a preferred embodiment, the quaternary hydroxide is at least one selected from the group consisting of tetraethylammonium hydroxide, tetrapropylammonium hydroxide, tetrabutylammonium hydroxide, tributylmethylammonium hydroxide, benzyltrimethylammonium hydroxide, ethyltrimethylammonium hydroxide, choline hydroxide, tris-choline hydroxide, bis-choline hydroxide, and diethyldimethylammonium hydroxide. In a more preferred embodiment, the ionic liquid is at least one selected from the group consisting of a TBPH water solution and choline hydroxide. In an even more preferred embodiment, the concentration of TBPH water solution is in a range of 30 to 50 wt. %, preferably 35 to 45 wt. %, or even more preferably about 40 wt. %, each wt. % based on the total weight of the solution. In a most preferred embodiment, a choline hydroxide methanol solution has a concentration of 30 to 50 wt. %, preferably 35 to 45 wt. %, or even more preferably about 40 wt. %, each wt. % based on the total weight of the solution. In some embodiments, the quaternary hydroxide present in the ionic liquid is in an amount of at least 10 wt. % based on the total weight of the ionic liquid, preferably at least 20 wt. %, preferably at least 30 wt. %, preferably at least 50 wt. %, based on the total weight of the ionic liquid. In some embodiments, the quaternary hydroxide has at least 5 carbons, preferably at least 8 carbons, preferably at least 11 carbons, or even more preferably at least 14 carbons. Other ranges are also possible.

In some embodiments, $R_1$, $R_2$, $R_3$, and $R_4$ are each independently selected from the group consisting of an optionally substituted alkyl, an optionally substituted benzyl, and an optionally substituted aryl. In some embodiments, "alkyl," by itself or as part of another substituent, means, unless otherwise stated, a straight (i.e., unbranched) or branched carbon chain (or carbon), or a combination thereof, which may be fully saturated, mono- or polyunsaturated and can include mono-, di- and multivalent radicals. The alkyl may include a designated number of carbons (e.g., $C_1$-$C_{10}$ means one to ten carbons). In some embodiments, the alkyl is fully saturated. In embodiments, the alkyl is monounsaturated. In some embodiments, the alkyl is polyunsaturated. Alkyl is an uncyclized chain. Examples of saturated hydrocarbon radicals include but are not limited to, groups such as methyl, ethyl, n-propyl, isopropyl, n-butyl, t-butyl, isobutyl, sec-butyl, methyl, homologs, and isomers of, for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1, 4-pentadienyl), ethynyl, 1- and 3-propynyl, 3-butynyl, and the higher homologs and isomers. An alkoxy is an alkyl attached to the remainder of the molecule via an oxygen linker (—O—). An alkyl moiety may be an alkenyl moiety. An alkyl moiety may be an alkynyl moiety. An alkenyl includes one or more double bonds. An alkynyl includes one or more triple bonds.

In some embodiments, the term "aryl" means, unless otherwise stated, a polyunsaturated, aromatic, hydrocarbon substituent, which can be a single ring or multiple rings (preferably from 1 to 3 rings) that are fused together (i.e., a fused ring aryl) or linked covalently. A fused ring aryl refers to multiple rings fused together wherein at least one of the fused rings is an aryl ring and wherein the multiple rings are attached to the parent molecular moiety through any carbon atom contained within an aryl ring of the multiple rings. The term "heteroaryl" refers to aryl groups (or rings) that contain at least one heteroatom, such as N, O, or S, wherein the nitrogen and sulfur atoms are optionally oxidized, and the nitrogen atom(s) are optionally quaternized.

At step 106, the method 100 includes sonicating the slurry to form a first composition containing dissolved keratin. In some embodiments, the cleaned wool fibers are present in the slurry at a concentration of 0.01 to 0.3 grams per milliliter (g/mL) based on the total volume of the ionic liquid, preferably 0.05 to 0.2 g/mL, preferably 0.1 to 0.15 g/mL, or even more preferably about 0.13 g/mL based on the total volume of the ionic liquid. In some embodiments, the sonication is conducted by a probe sonicator for 5 to 60 minutes, preferably 10 to 50 minutes, preferably 20 to 40 minutes, or even more preferably about 30 minutes, where the slurry temperature is in a range of 30 to 90 degrees centigrade (° C.) during the sonication process, preferably 40 to 80° C., preferably 50 to 70° C., or even more preferably about 60° C. The probe sonicator provides sonication energy at from 0.1 to 100 Hertz (Hz), preferably 1 to 90 Hz, preferably 10 to 80 Hz, preferably 20 to 70 Hz, preferably 30 to 60 Hz, or even more preferably 40 to 50 Hz. In some embodiments, the probe sonicator has a tip with a diameter in a range of 1 to 20 mm, preferably 2 to 15 mm, preferably 3 to 10 mm, preferably 4 to 8 mm, or even more preferably about 6 mm. In some preferred embodiments, the tip of the sonicator is at least 1/10 inserted into the slurry, preferably at least 1/8, preferably 1/6, preferably 1/3, or even more preferably at least 1/2 inserted into the slurry. In some further preferred embodiments, the weight percent of the dissolved keratin is at least 50 wt. % based on the weight of the cleaned wool fibers, preferably at least 60 wt. %, preferably at least 70 wt. %, preferably at least 80 wt. %, or even more preferably at least 90 wt. % based on the weight of the cleaned wool fibers. Other ranges are also possible.

In a preferred embodiment of the present disclosure the sonicator is mounted inside a cylindrical vessel. The sonicator probe is preferably located in the bottom half, more preferably bottom one quarter of the cylinder, e.g., the probe tip is suspended no higher than 0.5 or 0.25 the height of the cylindrical vessel from the bottom. The cylindrical vessel preferably includes a recirculation system including an outlet at the bottom of the cylinder and an inlet at the top of the cylinder. The outlet and inlet are preferably mounted such that suspended material flow enters the cylindrical vessel tangential to the axis of the cylindrical vessel. The suspension of fibers is preferably continuously withdrawn from the bottom outlet and re-introduced at the top inlet into the cylindrical vessel. The suspension of fibers is circulated during the period of sonicating and permits and even distribution of sonic energy throughout the mass of fibers. The pump used to circulate the fiber suspension is preferably a slurry pump, most preferably and open impeller centrifugal pump that may provide mechanical agitation and/or mixing in combination with the sonicating occurring inside the cylindrical vessel. The cylindrical vessel preferably has dimensions such that an inner diameter is no more than 0.4 times the height of the cylindrical vessel measured from a bottom face to a top face thereof. Narrower cylindrical vessels such as those having a ratio of inner diameter to total length of 0.2 or less may be used continuously such that a fiber slurry is not re-circulated through cylindrical vessel but instead passes through one time.

At step 108, the method 100 includes mixing the first composition with water to precipitate the keratin from the first composition. In some embodiments, for the regeneration of dissolved components of a wool fiber keratin, the wool/ionic liquid solutions were poured into a beaker containing deionized water (act as an anti-solvent) followed by high-speed centrifugation at 5,000 to 20,000 revolutions per minute (rpm), preferably 8,000 to 17,000 rpm, preferably 11,000 to 14,000 rpm, or even more preferably about 12,000 rpm for 5 to 50 minutes, preferably 8 to 40 minutes, preferably 11 to 30 minutes, preferably 14 to 20 minutes, or even more preferably about 15 minutes. Other ranges are also possible.

At step 110, the method 100 includes separating and collecting the precipitated keratin from the first composition, washing, and drying to form the keratin. In some embodiments, the precipitated water-insoluble component of the wool fiber keratin was washed with deionized water several times and again centrifuged at 1,000 to 10,000 rpm, preferably 2,000 to 8,000 rpm, preferably 3,000 to 6,000 rpm, or even more preferably about 4,000 rpm for 1 to 30 minutes, preferably 5 to 20 minutes, or even more preferably about 10 minutes to remove any traces of ionic liquid. The final residue collected was then placed in a freeze-dryer. Other ranges are also possible.

The purity and the molecular masses of untreated wool, extracted keratin from TBPH, and extracted keratin from choline hydroxide may be characterized by sodium dodecyl sulphate-polyacrylamide gel electrophoresis (SDS-PAGE), respectively. In some embodiments, the SDS-PAGE are determined by Bradford's assay, and the reduced protein solution is electrophoresed in polyacrylamide gel at 200 volts for about 1 hour.

Figure 12:
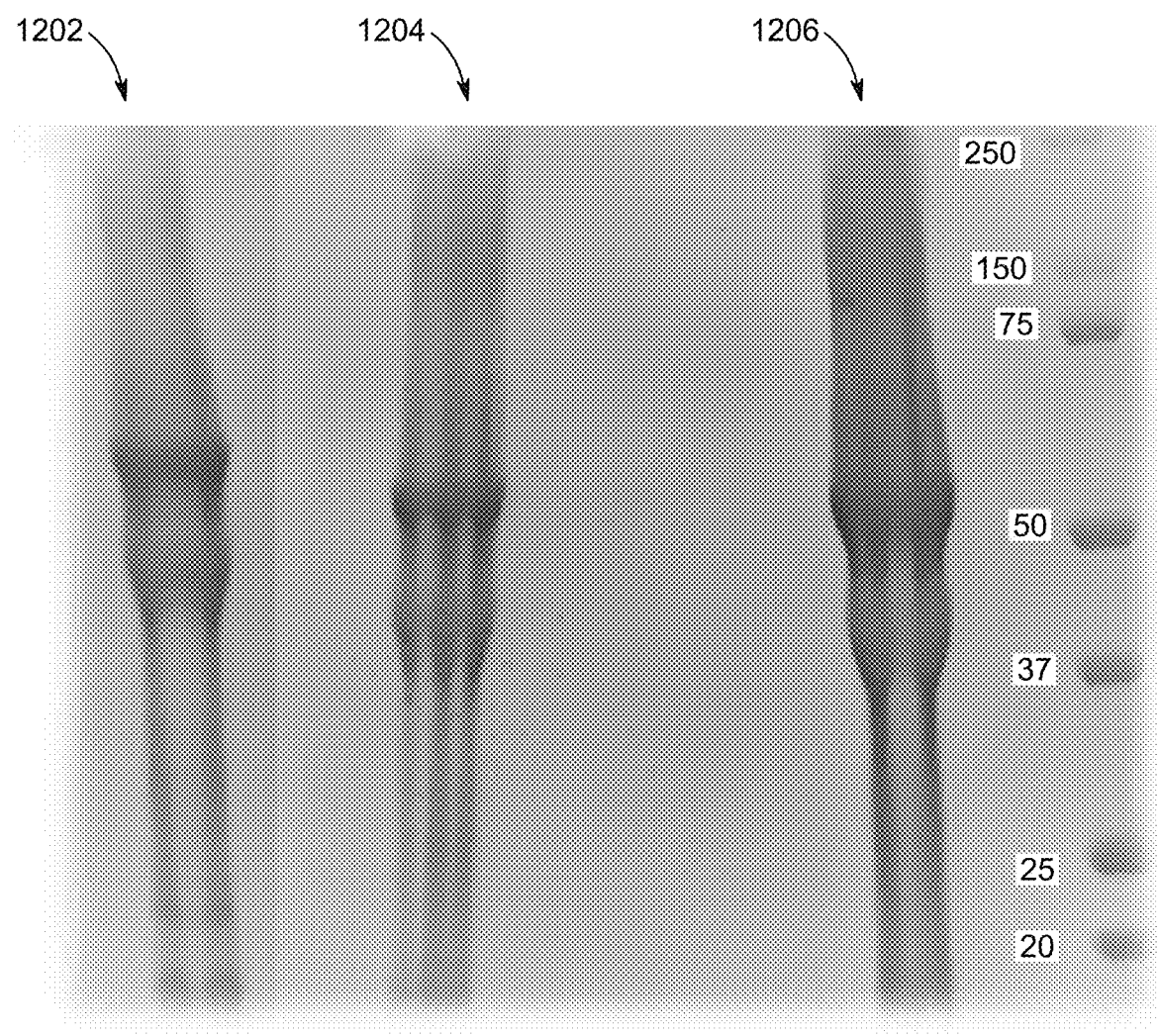
FIG. 12 illustrates a sodium dodecyl sulfate polyacrylamide gel electrophoresis (SDS-PAGE) of the keratin extracted from TBPH, choline hydroxide, and untreated wool fibres, according to certain embodiments.

The keratin extracted and precipitated from the wool fibers has an amorphous morphology and an average particle size of less than 1 micrometer ($\mu$m), preferably less than 0.8 $\mu$m, preferably less than 0.6 $\mu$m, preferably less than 0.4 $\mu$m, or even more preferably less than 0.2 $\mu$m. In some embodiments, the extracted keratin shows a first molecular weight band of about 30 to 80 kilodaltons (kDa), preferably about 40 to 70 kDa, or more preferably about 50 to 60 kDa, and a second molecular weight band of about 10 to 30 kDa, preferably about 15 to 25 kDa, or even more preferably about 20 kDa, as depicted in FIG. 12. In some embodiments, the untreated wool has molecular weight bands of about 200 to 300 kDa, about 100 to 200 kDa, about 50 to 100 kDa, about 20 to 50 kDa, and about 10 to 30 kDa. Other ranges are also possible.

Figure 10:
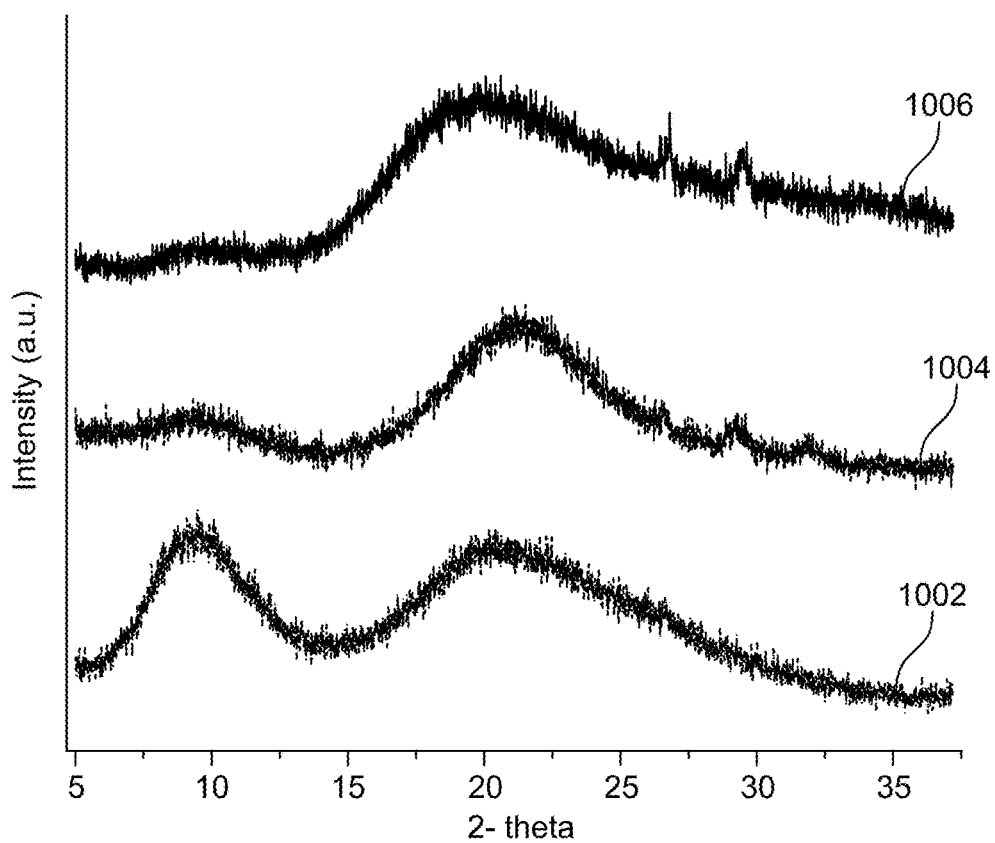
FIG. 10 illustrates an X-ray diffraction (XRD) pattern of the untreated wool fibers, the keratin regenerated from TBPH, and the keratin regenerated from choline hydroxide, according to certain embodiments.

The crystalline structures of untreated wool, extracted keratin from TBPH, and extracted keratin from choline hydroxide may be characterized by X-ray diffraction (XRD), respectively. In some embodiments, the XRD patterns are collected in a Bruker AXS diffractometer equipped with a Cu-K$\alpha$ radiation source ($\lambda$=0.15406 nm) for a 2$\theta$ range extending between 5 and 80°, preferably 15 and 70°, further preferably 30 and 60° at an angular rate of 0.005 to 0.04° $s^{-1}$, preferably 0.01 to 0.03° $s^{-1}$, or even preferably 0.02° $s^{-1}$. In some embodiments, the untreated wool has peaks with a 2-theta ($\theta$) value of 5 to 15°, and 15 to 25° in an X-ray diffraction (XRD) spectrum, as depicted in FIG. 10. In some embodiments, the keratin reveals the occurrence of a broad and intense peak at a 2-theta ($\theta$) value of 25 to 30° in an X-ray diffraction (XRD) spectrum, preferably 26 to 29°, preferably 27 to 28° in the XRD spectrum, as depicted in FIG. 10. Other ranges are also possible.

Figure 9:
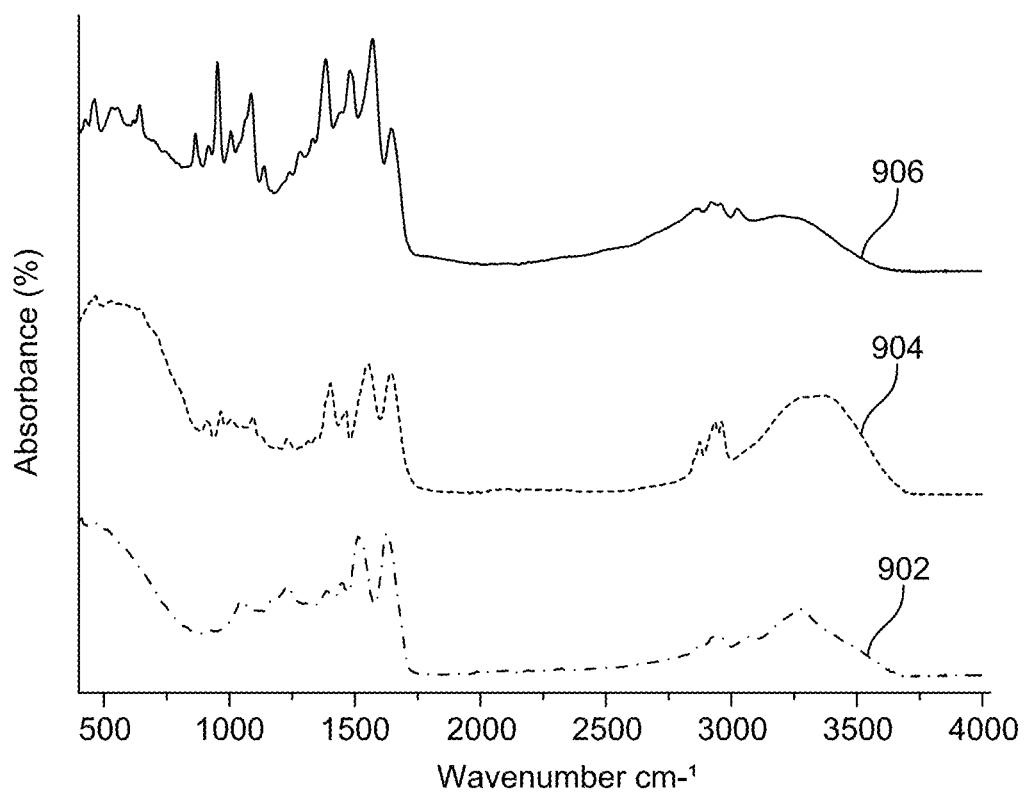
FIG. 9 illustrates a Fourier transform infrared spectrum (FT-IR) of untreated wool fibers, the keratin extracted from TBPH, and the keratin extracted from choline hydroxide, according to certain embodiments.

The structures of untreated wool, extracted keratin from TBPH, and extracted keratin from choline hydroxide may be characterized by Fourier transforms infrared spectroscopy (FT-IR), respectively. In some embodiments, the FT-IR are collected in a Perkin Elmer 2000 series acquired in a range of 4000 to 400 centimeter inverse (cm$^{31}$ $^1$) at 4 cm$^{-1}$ resolution. 20 scans were carried out for each sample. In some embodiments, the keratin has peaks at 800 to 1100 cm$^{-1}$, 1250 to 1700 cm$^{-1}$, and 2700 to 3500 cm$^{-1}$ in a Fourier transform infrared spectrum (FT-IR), as depicted in FIG. 9. Other ranges are also possible.

The thermal stability of untreated wool, extracted keratin from TBPH, and extracted keratin from choline hydroxide may be characterized by thermogravimetric analysis (TGA), respectively. In some embodiments, the TGA are collected in a TGA 550 instrument acquired at a constant heating rate of 10° C./min from 20° C. to 800° C. under an inert atmosphere. In some preferred embodiments, the thermal stability of the keratin extracted from the wool fibers was found to be higher than that observed with raw wool fibers. Other ranges are also possible.

Figure 2:
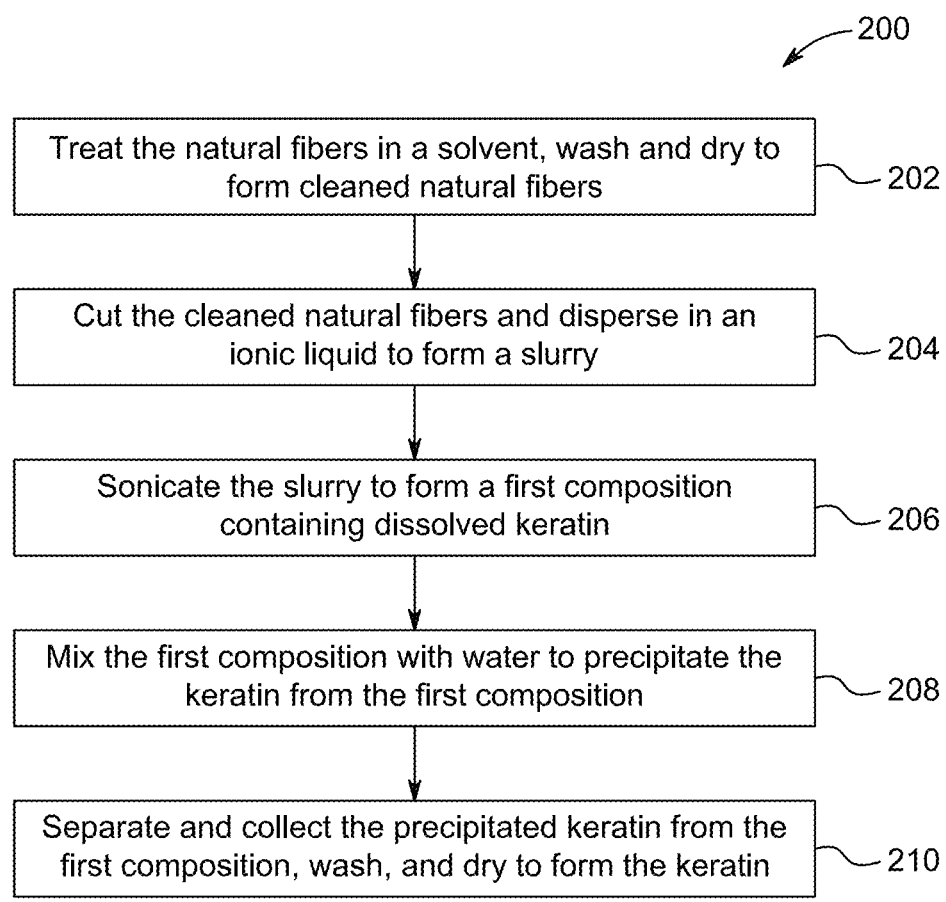
FIG. 2 is a schematic flow diagram of the method for extracting keratin from natural fibers, according to certain embodiments.

Referring to FIG. 2, a schematic flow diagram of the method for extracting keratin from natural fibers is illustrated. The order in which the method 200 is described is not intended to be construed as a limitation, and any number of the described method steps may be combined in any order to implement the method 200. Additionally, individual steps may be removed or skipped from the method 200 without departing from the spirit and scope of the present disclosure.

At step 202, the method 200 includes treating the natural fibers in a solvent, washing, and drying to form cleaned natural fibers. In some embodiments, the natural fibers are selected from animal fibers, plant fibers, liberian fibers, leaf fibers, metal fibers, and silica fibers. In some embodiments, the animal fibers are selected from silk, wool, and hair. In some further embodiments, the natural fibers are dissolved in a solvent mixture of hexane and dichloromethane solvent. In some preferred embodiments, a volume ratio of hexane to dichloromethane in the solvent is in the range of 10:1 to 1:10, preferably 1:8 to 8:1, preferably 1:6 to 6:1, preferably 1:2 to 2:1, or even more preferably about 1:1. In some most preferred embodiments, the natural fibers were further air dried to obtain the cleaned natural fibers.

At step 204, the method 200 includes cutting the cleaned natural fibers and dispersing in an ionic liquid to form a slurry. In some embodiments, the ionic liquid includes at least one liquid, and a quaternary hydroxide. In some embodiments, the at least one liquid is selected from the group consisting of water, methanol, ethanol, propanol, butanol, dimethylformamide, dimethylacetamide, dimethylsulfoxide, tetrahydrofuran, ethyl acetate, 1-formylpiperidine, n-methyl pyrrolidone, and acetonitrile. In some embodiments, the quaternary hydroxide is a compound of formula (I)

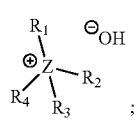

In one embodiment, Z is nitrogen (N) or phosphine (P). In a preferred embodiment, $R_1$, $R_2$, $R_3$, and $R_4$ are each independently selected from the group consisting of an optionally substituted alkyl, an optionally substituted benzyl, an optionally substituted aryl. In a further preferred embodiment, the quaternary hydroxide has at least 5 carbons. In one embodiment, Z is P. In a preferred embodiment, the quaternary hydroxide is at least one selected from the group consisting of tetrabutyl phosphonium hydroxide, tetraphenyl phosphonium hydroxide, methyl triphenyl phosphonium hydroxide, ethyl triphenyl phosphonium hydroxide, propyl triphenyl phosphonium hydroxide, butyl triphenyl phosphonium hydroxide, benzyl triphenyl phosphonium hydroxide, allyl triphenyl phosphonium hydroxide, dodecyl triphenyl phosphonium hydroxide, tetradecyl triphenyl phosphonium hydroxide, hexadecyl triphenyl phosphonium hydroxide, hexadecyl tributyl phosphonium hydroxide, carbethoxyethyl triphenyl phosphonium hydroxide, carbmethoxyethyl triphenyl phosphonium hydroxide, carbethoxymethyl triphenyl phosphonium hydroxide, and carbmethoxymethyl triphenyl phosphonium hydroxide.

In some embodiments, the Z is N. In one embodiment, the quaternary hydroxide is at least one selected from the group consisting of tetraethylammonium hydroxide, tetrapropylammonium hydroxide, tetrabutylammonium hydroxide, tributylmethylammonium hydroxide, benzyltrimethylammonium hydroxide, ethyltrimethylammonium hydroxide, choline hydroxide, tris-choline hydroxide, bis-choline hydroxide, and diethyldimethylammonium hydroxide. In some embodiments, the ionic liquid is at least one selected from the group consisting of a TBPH water solution and choline hydroxide. The concentration of TBPH water solution has a concentration in a range of 30 to 50 wt. %, and a choline hydroxide methanol solution has a concentration of 30 to 50 wt. %, each wt. % based on the total weight of the solution. In some embodiments, the quaternary hydroxide present in the ionic liquid is in an amount of at least 10 wt. % based on the total weight of the ionic liquid.

At step 206, the method 200 includes sonicating the slurry to form a first composition containing dissolved keratin. In some embodiments, the sonicating is conducted by a probe sonicator for 5 to 60 minutes, and the slurry temperature is in a range of 30 to 90° C. during the sonication process. In some embodiments, the probe sonicator can provide sonication energy at a frequency range of 0.1 to 100 Hz. In some embodiments, the weight percent of the dissolved keratin is at least 50 wt. % based on the total weight of the cleaned natural fibers. The sonication process aids in to achieve maximum dissolution of wool in ionic liquid. The enhancement of this key factor plays a significant role from an energy consumption perspective.

At step 208, the method 200 includes mixing the first composition with water to precipitate the keratin from the first composition. In some embodiments, the regeneration of dissolved components of natural fiber keratin is performed by pouring the ionic liquid solutions into a beaker containing de-ionized water (which act as an anti-solvent) followed by high-speed centrifugation for a few mins.

At step 210, the method 200 includes separating and collecting the precipitated keratin from the first composition, washing, and drying to form the keratin. In some embodiments, the precipitated water-insoluble component of the wool fiber keratin was washed with deionized water several times and again centrifuged for a few mins to remove any traces of ionic liquid. The final residue collected was then placed in a freeze-dryer.

EXAMPLES

The following examples demonstrate a method for extracting keratin from wool and natural fibers, as described herein. The examples are provided solely for illustration and are not to be construed as limitations of the present disclosure, as many variations thereof are possible without departing from the spirit and scope of the present disclosure.

Example 1: Materials and Substrate

Wool samples were provided by Wool Services International (New Zealand). All chemicals required for the cleaning and processing of wool fibers, including dimethyl sulfoxide (DMSO) (99.9%), ethanol (99%), acetone (99.8%), tetrabutyl phosphonium hydroxide (40 weight percent (wt. %) in water), choline hydroxide (45 wt. % in methanol) were purchased from Sigma-Aldrich, St. Louis, United States of America (USA), and used as received without further purification.

Example 2: Pre-Treatment of Wool Fibers

The collected sheep wool fibers (Wool Services International, New Zealand) were de-fatted in a Soxhlet extractor using a 1:1 v/v mixture of hexane and dichloromethane solvent system followed by rinsing with distilled water and air drying before solubility experimentations.

Example 3: Probe Sonication-Assisted Dissolution of the Wool Fibers in Ionic Liquids The cleaned wool fibers were cut into small pieces. In a typical dissolution trial, 0.5 grams (g) of the wool fibers were added into a 25 milliliters (ml) beaker containing 10 ml of ionic liquid. An ultrasonic probe sonicator (Ultrasonic Vibracell 130 Kw, 50 Hz) was used to dissolve the wool fibers. A 6-millimeter (mm) diameter tip of the probe sonicator was inserted into the mixture at ⅓rd the height of the total height of the mixture surface. The whole process of dissolution was performed at a defined sonication time, initial loading of wool fibers, amplitude/acoustic power, and sample volume. To investigate the time required for complete dissolution and the presence of undissolved sheep wool, aliquots of the mixture were taken periodically with the pipette and examined by light microscope (Dino-Lite Digital Microscope) at 30× magnifications.

To determine the complete dissolution, the mixture containing ionic liquid and the wool fibers was added into 3 volumes of dimethyl sulfoxide (DMSO) to lower the viscosity without precipitation of dissolved particles. The mixture was then stirred rapidly by a magnetic stirrer at 250 revolutions per minute (rpm) followed by centrifugation (Beckman, CPR centrifuge, USA) at 4000 rpm for 15 min at room temperature (approx. 22° C.). The residues collected were washed repeatedly with de-ionized water to remove excess DMSO and ionic liquid. The precipitates collected were placed in an oven (80° C.) for 12 hours and then weighed. The percentage of wool fibers dissolved in ionic liquid was calculated by using the following equation:

$$\text{Wool fibers dissolution (\%)} = \frac{W^o - Wr}{WA^o} \times 100$$

Where $W^o$ represents the initial weight of wool fibers added to the ionic liquid, and $W_r$ is the mass of undissolved material/residue.

Example 4: Regeneration of Wool Keratin Intermediate Filament Proteins

For this purpose, the wool/ionic liquid solutions were poured into a beaker containing 30 ml of de-ionized water (anti-solvent), followed by high-speed centrifugation at 12,000 rpm for 15 min. The precipitated water-insoluble component of the wool fiber keratin was washed with de-ionized water several times and again centrifuged at 4,000 rpm for 10 min to remove any traces of the ionic liquid. The final residue collected was then placed in a freeze dryer (Labcono, Kansas City, USA) for further characterization. For lyophilization, all samples were covered by paraffin film, and small holes were made to allow the release of water vapors, followed by their placement at −20 C. for 48 hours. The vacuum pump in the freeze dryer was warmed up, and condenser temperature was set to decrease to −50° C.

The percentage of dissolution and final yield obtained were used to determine the optimal extraction conditions for wool. The final yield was calculated as follows:

$$Wf = \frac{Wt}{W^o} \times 100$$

Where $W_f$ is the final yield, $W_t$ is the weight of the regenerated keratin, $W^o$ is the initial weight of wool fibers.

Example 5: Scanning Electron Microscope (SEM)

The morphological analysis of the samples was done with SEM (Zeiss Supra 55VP). The samples were gold coated and analyzed at an acceleration voltage of 10 kilovolts (kV) under a nitrogen atmosphere.

Example 6: Fourier Transforms Infrared Spectroscopy (FT-IR)

The functional groups of the untreated wool fibers and the regenerated wool proteins were determined by using Fourier Transforms Infrared-Attenuated Total Reflection (FTIR-ATR) (Perkin Elmer, 2000 series). All spectra were acquired in the range of 4000 to 400 centimeters inverse ($cm^{-1}$) at 4 $cm^{-1}$ resolution. 20 scans were carried out for each sample.

Example 7: X-Ray Diffraction (XRD) Analysis

The crystallinity of the untreated wool fibers samples and the regenerated keratin from the ionic liquids were studied using an XRD (Bruker AXS, AMERICA at 40 kV, 200 milliamperes (mA) in with Cu-Ka radiation.

Example 8: Thermogravimetric Analysis (TGA)

A thermogravimetric analyser (TGA 550) was used to determine the thermal stability of a tested material by analyzing the weight changes. Approximately 20 milligrams (mg) of the sample were weighed and then placed in the holder. The analysis was performed at a constant heating rate of 10° C./min from 20° C. to 800° C. under an inert nitrogen ($N_2$) atmosphere.

Example 9: Sodium Dodecyl Sulfate-Polyacrylamide Gel Electrophoresis (SDS-PAGE)

SDS-PAGE was done to investigate the purity and the molecular masses of the regenerated keratin. The protein content of the samples was determined by using Bradford's assay. 200 uL of SDS buffer (200 mM dithiothreitol) mixed with 1 mg of each sample, followed by heating briefly. The reduced protein solution was further loaded into the gel (Bio-Rad's Criterion XT Pre Cast polyacrylamide gel). Precision Plus protein standards (10-250 k D) were used as a protein marker. A constant voltage of 200 V was maintained throughout the electrophoresis for about 1 hour. The gel was treated with fixing and washing solutions followed by staining with Commasie Brilliant Blue staining method. The gel was then digitally imaged to determine the appearance of the bands.

Example 10: Mechanism of Keratin Dissolution and Possible Interaction Using Ionic Liquid The surface of wool fiber is covered by an outer lipid layer consisting of 18-methyleicosanoic acid bound to the underlying proteins by a thioester linkage. The process of wool dissolution was initiated with the breakage of the thioester linkage, followed by the penetration of ionic liquid into the cortex layer. However, to completely dissolve the wool fibers in ionic liquid, disruption of inter- and intra-molecular bonds such as hydrogen bonding and the disulfide bonds between the polypeptide chain was required. The highly polar nature of ionic liquids assists them in dissolving various polymers effectively.

Tetrabutylphosphonium hydroxide (TBPH) and choline hydroxide were investigated separately as a solvent for the dissolution and regeneration of wool keratin. Imidazolium-based ionic liquids with chloride anions were tested to be good solvent candidates compared to other tested ionic liquids. To overcome the cytotoxicity of imidazolium-based ionic liquids and cost management, TBPH and choline hydroxide were studied for wool fibers dissolution. The present disclosure describes hydroxide-containing ionic liquids, instead of other tested anions, such as $Cl^-$, $BF_4$, $PF_6$, and Br, for the regeneration of wool keratin. TBPH was investigated for the rapid dissolution of cellulose at 25° C. temperature, and the results showed its stability during the complete process of dissolution. Similarly, choline hydroxide, a constituent of lecithin naturally present in many animal organs and plants; and, therefore, more benign to the environment, was also selected for keratin dissolution.

Example 11: Process Development for Wool Fiber Dissolution in Selected Ionic Liquids TBPH and choline hydroxide were investigated for wool fibers dissolution. The whole process of dissolution was developed on the selected parameters, such as initial loading of the wool, period of sonication, and ultrasonic acoustic power. Additionally, the ability of the selected ionic liquids to completely dissolve the wool fibers was also evaluated.

Initial Loading

Figure 3:
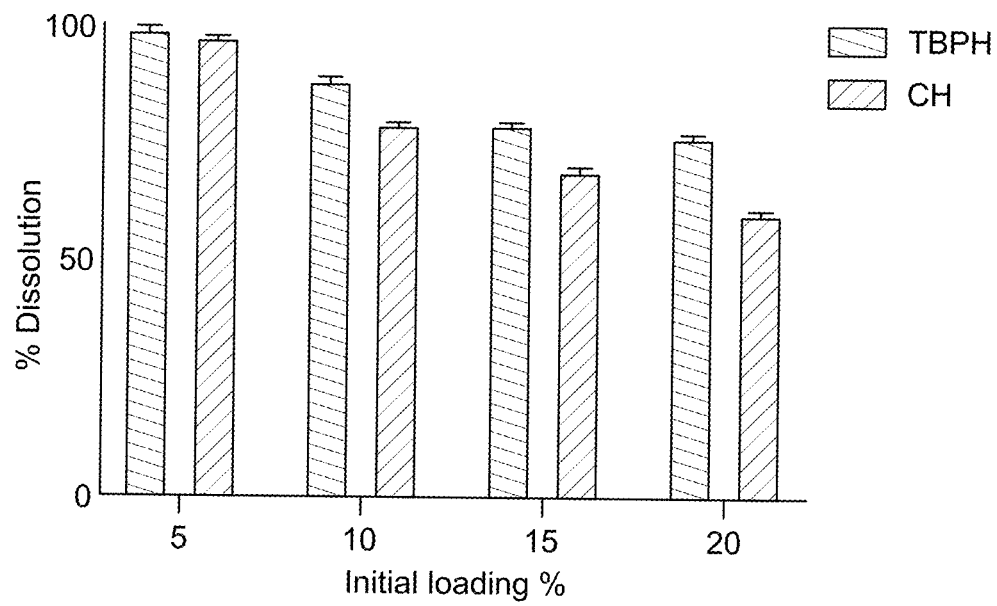
FIG. 3 illustrates a dissolution with respect to initial loading in tetrabutyl phosphonium hydroxide (TBPH) and choline hydroxide, according to certain embodiments.

To determine the effect of initial loading on the process of dissolution, different amounts of wool fibers were added to the same volume of ionic liquid (10 ml), followed by probe sonication at defined acoustic power (30%) and sonication time (15 mins). FIG. 3 shows the rate of dissolution of the wool fibers with an initial loading in TBPH & choline hydroxide. As the initial loading increased from 5 to 20%, the percentage dissolution decreased significantly from 100% to 76.5% for TBPH and 98% to 60% for choline hydroxide. The results were recorded at a constant sonication time of 15 min and acoustic power of 30% for varying initial loadings in both the tested ionic liquids. The implication of ultrasonic technology for the dissolution process significantly reduced the overall processing time, i.e., from several hours to minutes. This made the process much more energy efficient and less time-consuming compared to the previous studies that reported the processing time of several hours. The tip of the ultrasonic probe sonicator produced cavitation, which created a bubble, inside of which has extremely high pressure and temperature effect (50 Mega-Pascal (MPa) & 5000 Kelvin (K)). Cavitation has both physical and chemical effects. The chemical effect was that the bubble containing radicals (mainly due to the high pressure and temperature) collapsed adiabatically, resulting in the radical release, which in turn caused the destruction of the wool structure and allowed the penetration of ionic liquid into the wool fibers. The applications of ultrasonic technology resulted in 98% dissolution of wool fiber in TBPH within 15 min, as shown in FIG. 3. The whole process of wool fibers dissolution in TBPH and choline hydroxide was developed on selected parameters such as initial loading of sample, ultrasonic acoustic power, period of sonication, and the type of ionic liquid.

In a typical dissolution trial, 0.5 gm (5 wt. %) of wool fibers were added into 10 ml of TBPH and sonicated to determine the time required to achieve complete dissolution. About 100% dissolution was observed in 15 mins. To further investigate the effect of increased initial loading on the dissolution process, various amount (5, 10, 15 and 20 wt. %) was added to the same volume of TBPH. The effect of different initial loading on the dissolution of wool fibers is shown in FIG. 3. The percentage dissolution decreased from 100% to 76.4% on increasing the initial loading from 5% to 20%. Undissolved particles were observed for both 15 and 20% initial loading of the wool fibers when the mixture was viewed under a microscope. The percentage dissolution of wool fibers with choline hydroxide was 98%, 80%, 69%, and 60% with 5%, 10%, 15%, and 20% of initial loading, respectively, as shown in FIG. 3. The results indicate that the dissolution capability of both TBPH and choline hydroxide decreased as the initial loading was increased from 5 to 20%. The property of ionic liquid was due to the saturation point of dissolution capability of the tested ionic liquid. The results also showed that TBPH exhibited a higher capability of wool dissolution at the same initial loading amount compared to choline hydroxide.

Another important aspect that directly affected the dissolution process was the viscosity of the ionic liquid. The viscosity of the mixture is proportional to the amount of initial loading. The greater the amount of initial loading, the higher the viscosity of the mixture. This increased viscosity hinders the process of mass transfer and mixing, resulting in decreased dissolution. Thus, one of the significant limitations of ultrasonic-assisted dissolution was the mixture's increased viscosity, which prevents the cavitation bubbles generated by the probe sonicator tip from evenly disrupting the wool fiber structure. Therefore, a lower percentage of dissolution was observed at higher values of initial loading with both TBPH and choline hydroxide.

Sonication Time/Period of Sonication

Figure 4:
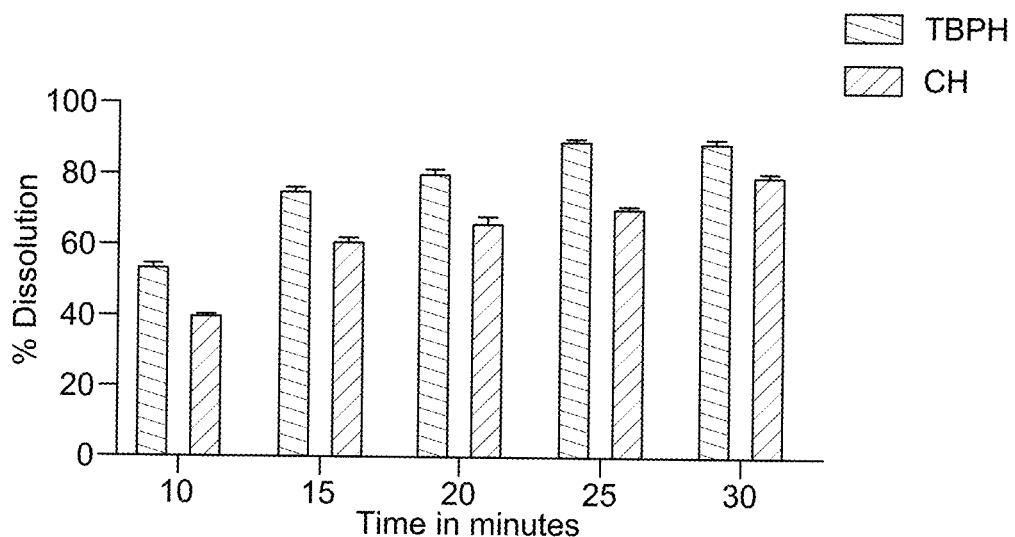
FIG. 4 illustrates an effect of sonication time on dissolution of the wool fibers in TBPH and choline hydroxide (at a constant amplitude of 30% and initial loading of 20%), according to certain embodiments.
Figure 5A:
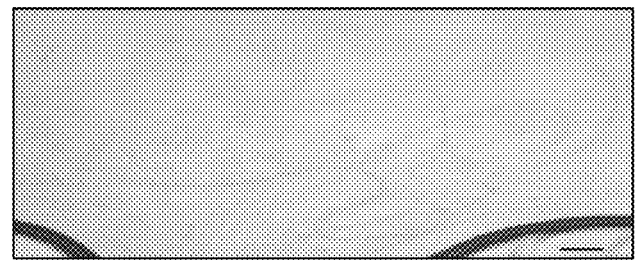
FIG. 5A illustrates a light microscopic image of the wool dissolution in TBPH at an interval of 10 min, according to certain embodiments.
Figure 5B:
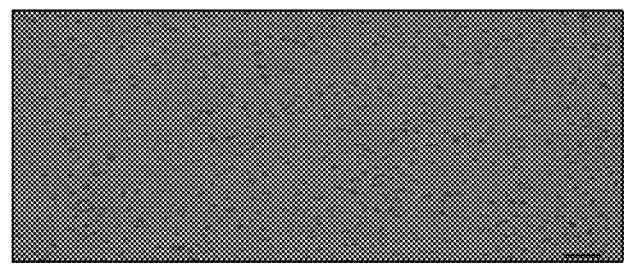
FIG. 5B illustrates a light microscopic image of the wool dissolution in TBPH at an interval of 15 min, according to certain embodiments.
Figure 5C:
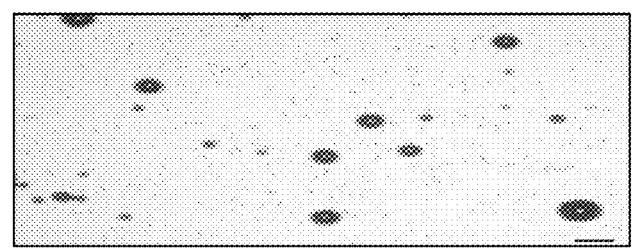
FIG. 5C illustrates a light microscopic image of the wool dissolution in TBPH at an interval of 20 min, according to certain embodiments.
Figure 5D:
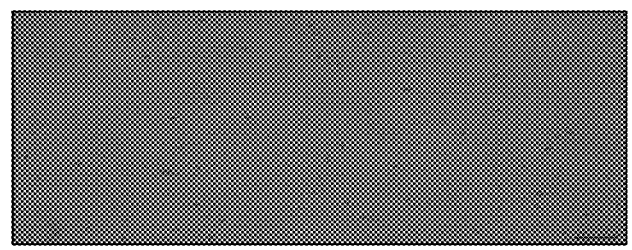
FIG. 5D illustrates a light microscopic image of the wool dissolution in TBPH at an interval of 25 min, according to certain embodiments.
Figure 5E:
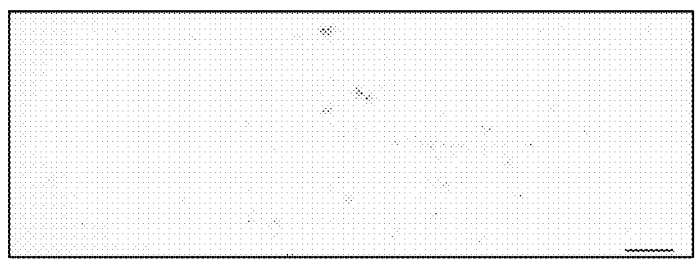
FIG. 5E illustrates a microscopic image of the wool dissolution in TBPH at an interval of 30 min, according to certain embodiments.

An important parameter to enhance was the period of sonication to achieve maximum dissolution of wool in ionic liquid. This key factor plays a significant role from an energy consumption perspective. The effect of sonication time was studied at a constant amplitude of 30% for 10, 15, 20, 25, and 30 minutes of sonication. The results of this study are depicted in FIG. 4. For TBPH, the percentage dissolution observed was 54%, 76.5%, 81%, 90%, and 90% for 10,15, 20, 25, and 30 minutes of sonication, respectively, at constant initial loading of 20% as shown in FIG. 4. Similarly, for choline hydroxide, 40%, 60%, 65%, 70%, 80% of dissolution was observed after 10, 15, 20, 25, and 30 minutes of sonication, respectively, at constant initial loading of 20%. To determine the presence of undissolved particles in the ionic liquid/wool fibers mixture, a small amount of the mixture was periodically taken and examined under the light microscope. FIGS. 5A-5E shows the microscopic images taken at different time intervals. FIG. 5A shows a microscopic image of the wool dissolution in TBPH at an interval of 10 min. FIG. 5B shows a microscopic image of the wool dissolution in TBPH at an interval of 15 min. FIG. 5C shows a microscopic image of the wool dissolution in TBPH at an interval of 20 min. FIG. 5D shows a microscopic image of the wool dissolution in TBPH at an interval of 25 min. FIG. 5E shows a microscopic image of wool dissolution in TBPH at an interval of 30 min. It was observed that the presence of undissolved particles decreased as the sonication period increased. Thus, for TBPH, the maximum dissolution was found to be 90% when the mixture was sonicated for 25 min. However, the results observed were the same when the sonication period was further increased from 25 min to 30 min. The results showed that at the initial loading of 20% and 30% acoustic power, the maximum dissolution percentage recorded was 90% after 25 min of sonication. Compared with choline hydroxide, the percentage dissolution of wool fibers in ionic liquid was 80% after 30 min of sonication. Unlike the conventional heating method for dissolution, the implication of ultrasonic technology shortens the overall time required for wool dissolution in ionic liquid. Additionally, the temperature recorded throughout the process was 66° C. (30% acoustic power), much lower than the temperature reported in previous studies.

Ultrasonic Acoustic Power

Figure 6:
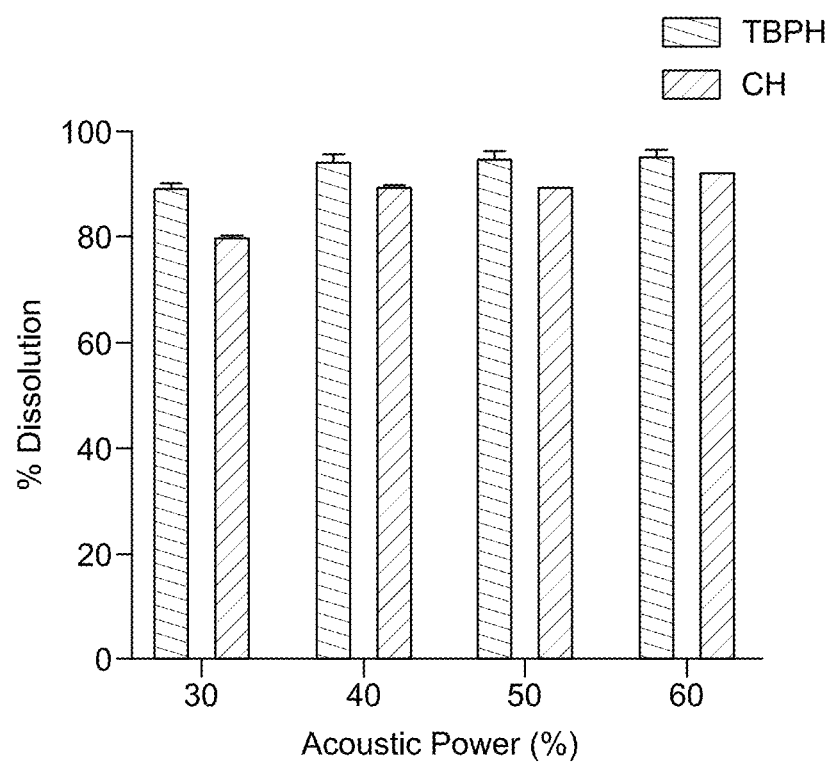
FIG. 6 illustrates an effect of amplitude/ultrasonic acoustic power on the wool dissolution in TBPH and choline hydroxide (at constant initial loading of 20% and sonication time of 30 mins), according to certain embodiments.

To determine the influence of ultrasonic acoustic power on the process of wool dissolution in respective ionic liquids, the acoustic power in the range of 30-60% with a 10% interval was studied at a constant period of sonication and initial loading. FIG. 6 shows the effect of amplitude/ultrasonic acoustic power on the dissolution of the wool fibers in TBPH and choline hydroxide (at constant initial loading and sonication time). For TBPH, the percentage dissolution observed was 90%, 95%, 95%, and 95% for acoustic power of 30%, 40%, 50%, and 60%, respectively, as shown in FIG. 6. It is important to note that these results were recorded while keeping the constant initial loading of 20% and the same sonication period, i.e., 25 min. However, for choline hydroxide, the percentage dissolution was 80%, 90%, 90%, and 92% for the increase of acoustic power from 30% to 40%, 50%, and 60%, as shown in FIG. 6. These values were recorded at a constant 20% initial loading and sonication time of 30 min.

The amplitude/acoustic power produced by the ultrasonic tip directly affects the bubble cavitation behavior, influencing the overall dissolution process as it is related directly to ultrasonic irradiation. In short, the intensity of the ultrasonic acoustic power is related directly to the percentage dissolution of wool in ionic liquid. Similarly, the results also showed a higher percentage of wool dissolution, which was observed with increased amplitude. FIG. 6 shows that 95% of dissolution was observed in TBPH at 40 and 50% acoustic power when the mixture was sonicated for 25 min. Similarly, for choline hydroxide, the observed percentage dissolution was 90% with 40 and 50% acoustic power for 30 min of sonication. Therefore, instead of using a 50% lower range of acoustic power, 40% acoustic power was considered for the dissolution process, as a higher power range can damage the tip of the probe sonicator.

Variation of Temperature Recorded with Reaction Time

Figure 7:
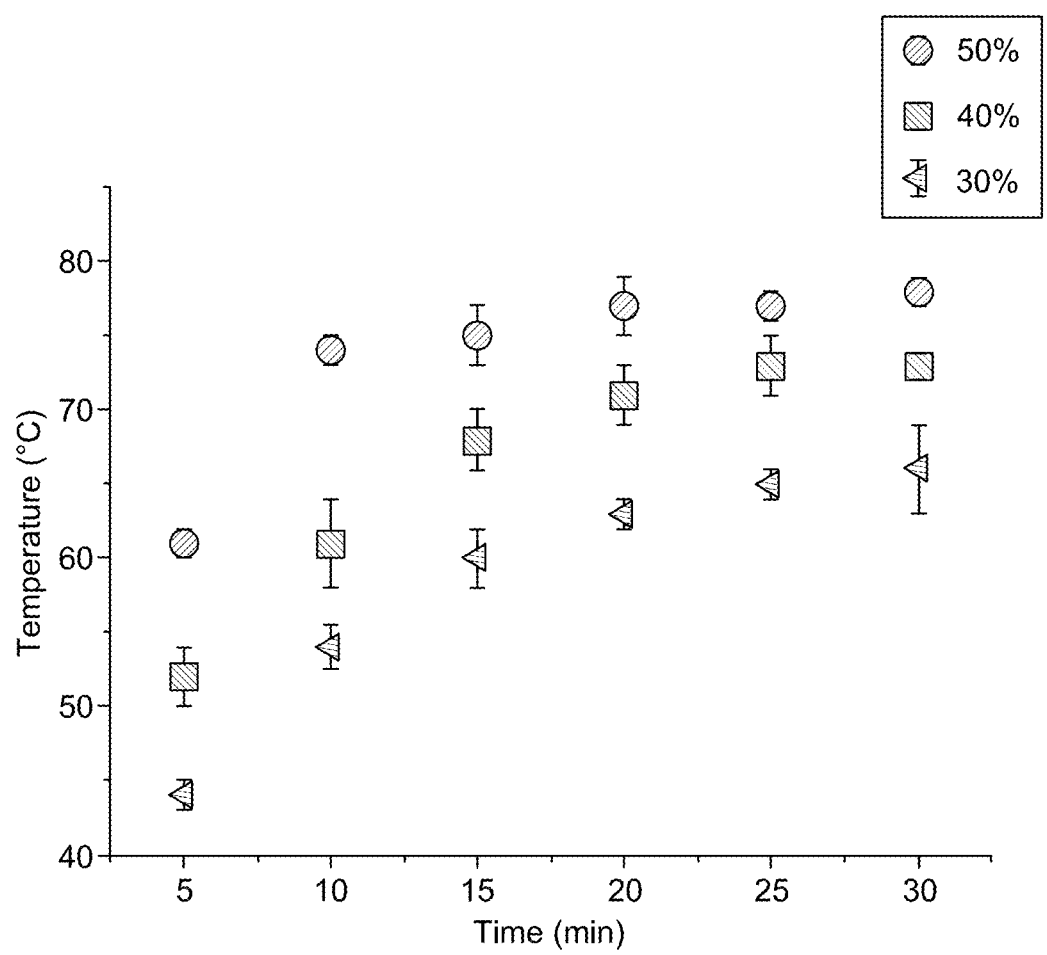
FIG. 7 illustrates temperature changes recorded with reaction time and amplitude (%), according to certain embodiments.

An increase in temperature was also monitored throughout the dissolution process to understand the dissolution process better. It was observed that as the period of sonication increased; the temperature rose significantly. Thus, the maximum temperature recorded was 73° C. when the mixture was sonicated at 40% acoustic power for 30 min. Similarly, the maximum temperatures recorded were 66° C. and 78° C. for 30 min of reaction time at 30% and 50% of amplitude, as shown in FIG. 7. Accordingly, the increased temperature significantly improved the overall process of dissolution as it provided higher ionic mobility by decreasing the viscosity of the mixture. However, the high-temperature dissolution resulted in the disrupted/disordered structure of the final extracted keratin. A study on the effect of temperature in the dissolution of wool in ionic liquid was conducted revealing that when the temperature was increased from about 120° C. to 180 ° C., a decrease in the cysteine content (about 8.91 to 0.99 mol %) was observed in the final extracted keratin. Therefore, a very high-temperature range should be avoided to preserve the valuable amino acids in the final product.

Based on the results, the developed conditions for wool dissolution in TBPH were 40% acoustic power for 25 min of sonication with an initial loading of 20%. Similarly, for choline hydroxide optimal conditions observed was 40% acoustic power for 30 min of sonication with an initial loading of 20%. Under these optimal conditions, the percentage dissolution observed for TBPH was 95%, whereas, for choline hydroxide, it was 90%, respectively. It was also observed that among the two tested ionic liquids, TBPH dissolved the wool fibers entirely in a shorter period as compared to choline hydroxide. The difference in dissolving efficiency of the two tested ionic liquids might be due to the difference in their viscosity. Low-viscosity liquid facilitates the maximum transfer of cavitation bubbles produced by the tip of the ultrasonic probe sonicator. Therefore, if the viscosity of the heterogenous solution is high, it minimizes the transfer of cavitation bubbles, resulting in the decreased dissolution of wool in the ionic liquid. The high viscosity of choline hydroxide might result in its lower dissolution efficiency.

Example 12: Morphological Analysis of the Regenerated Keratin by SEM

Figure 8A:
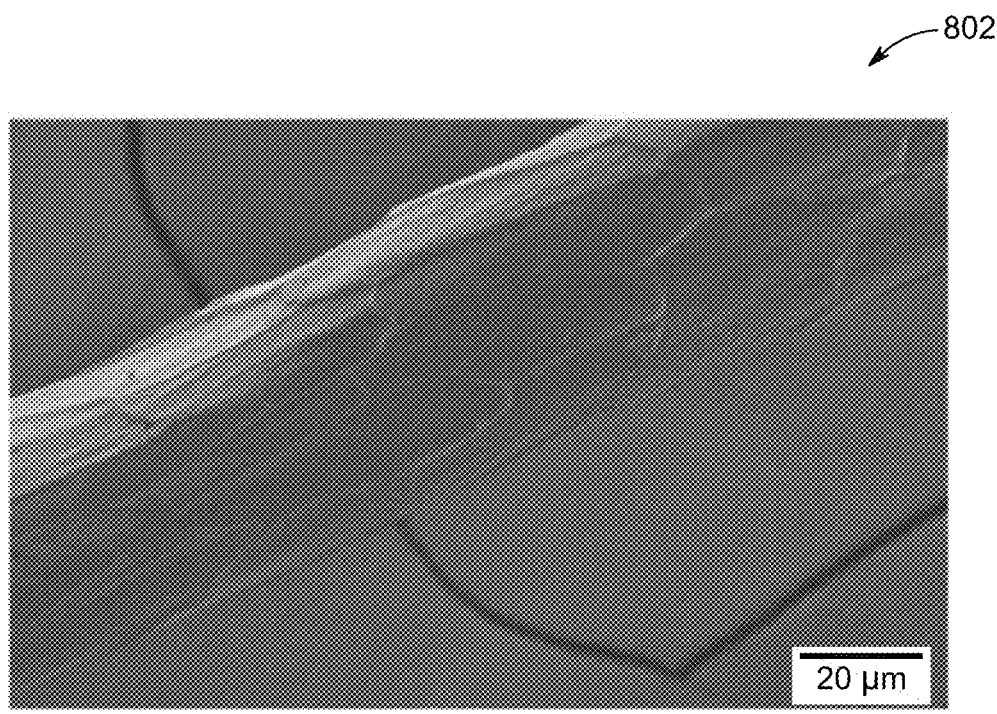
FIG. 8A illustrates a scanning electron microscope (SEM) image of untreated wool fibers at a scale bar of 20 micrometers (μm), according to certain embodiments.

The surface morphology of untreated wool samples and regenerated keratin was studied using SEM. The untreated wool samples possessed a tough fibrous structure, as shown in FIG. 8A.

Figure 8B:
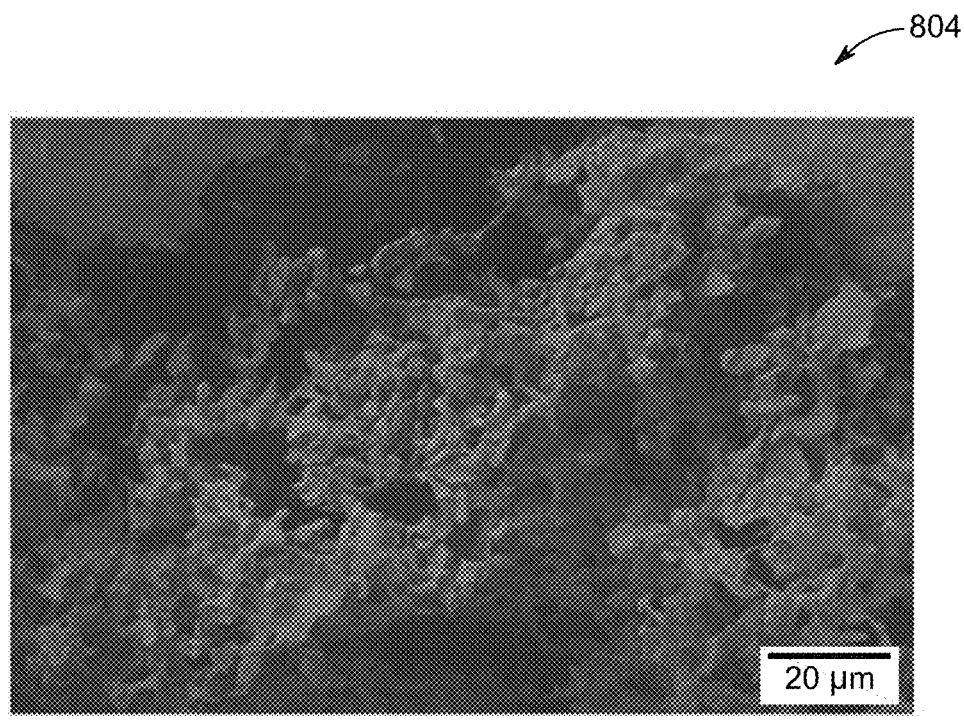
FIG. 8B illustrates a SEM image of the keratin regenerated from TBPH at a scale bar of 20 μm, according to certain embodiments.
Figure 8C:
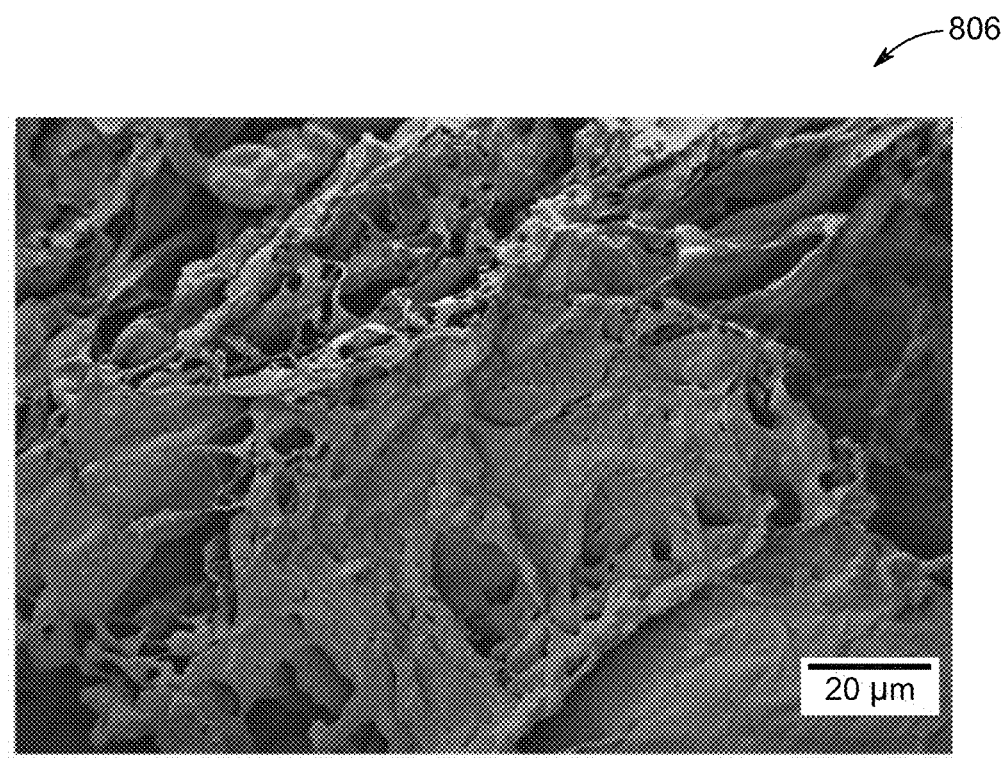
FIG. 8C illustrates a SEM image of the keratin regenerated from choline hydroxide at a scale bar of 20 μm, according to certain embodiments.

The results show that the surface morphology of wool fibers changed significantly after immersion in ionic liquids. Furthermore, the application of ultrasonication also resulted in rapid disruption of the highly compact, insoluble protein by allowing ionic liquid to penetrate its disordered structure to promote hydrolysis. The highly compact and smooth structure of keratin was lost when eco-friendly, non-toxic ionic liquids interacted with wool fibers. FIGS. 8B-8C indicates the interaction of ionic liquids with the keratin polypeptide chains, resulting in the generation of nanosized powder keratin. Thus, the loose, amorphous structure of the extracted keratin might be molded easily in the form of 3-dimensional scaffolds/sponges, films, and gels for various biomedical applications.

Example 13: FT-IR Analysis

FIG. 9 illustrates an FT-IR of the untreated wool fibers (902), the keratin extracted from TBPH (904), and the keratin extracted from choline hydroxide (906). The characteristic absorption bands due to the peptide bonds (—CONH—) and their vibrations assigned to amide A, amides I, II, and III were observed. Amide A band was observed at 3295 cm$^{-1}$ for the regenerated keratin from TBPH. This band is mainly due to N—H bond vibrations and was at 3208 cm$^{-1}$ for the untreated wool samples. A sharp peak observed at 1647 cm$^{-1}$ corresponds to the amide I. The vibrational frequency of the amide I band, which arises due to the C—O stretching, is sensitive to the protein secondary structure and, therefore, mainly used to determine the protein secondary structure. For the untreated sample, the amide I peak was observed at 1634 cm$^{-1}$. The slight shifting of peaks in the regenerated keratin was due to the ionic liquid interaction with polypeptide chains. The amide II band observed at 1595 cm$^{-1}$ was due to N—H bending and C—H stretching. The Amide III band, due to N—H bending and CAN stretching, was observed at 1233 cm$^{-1}$.

For the keratin extracted from choline hydroxide, the peak values for Amide A, I, II, and III were observed at 3262, 1642, 1524, and 1231 cm$^{-1}$. Thus, the vibrations observed were due to the secondary β-sheet structure of the regenerated keratin. FIG. 10 shows XRD patterns to study the crystalline structures of the untreated wool and the keratin regenerated from ionic liquids. FIG. 10 illustrates an X-ray diffraction pattern of untreated wool and regenerated keratin from ionic liquids of untreated wool fibers (1002), keratin regenerated from TBPH (1004), and keratin regenerated from choline hydroxide (1006).

The XRD of untreated wool manifested two crystal structures, where two prominent peaks were observed at 2θ=9° and 19.8° (spectrum 1002 of FIG. 10). The peaks appeared at 2θ=9° mostly correspond to α-helix structure whereas, the β-sheet structure showed peaks at 19.8°.

The XRD pattern of the wool keratin regenerated from TBPH and choline hydroxide is shown in FIG. 10 (spectrum 1004 and 1006). Unlike wool keratin, the diffraction pattern observed for the regenerated keratin showed no prominent peaks at 9°. The disappearance of the peak at 9° for the regenerated keratin indicated the reduced crystallinity of the keratin after the dissolution and regeneration process. The diffraction pattern of the regenerated keratin also exhibited an additional peak at 2θ=27°, possibly due to some structural disorder resulting from probe sonication-assisted dissolution of the wool in ionic liquid. Thus, the regenerated keratin has a lower content of α-helix, but it maintained a β-sheet structure.

Example 14: Thermal Analysis of the Keratin Extracted by Thermogravimetric Analyzer (TGA)

Figure 11:
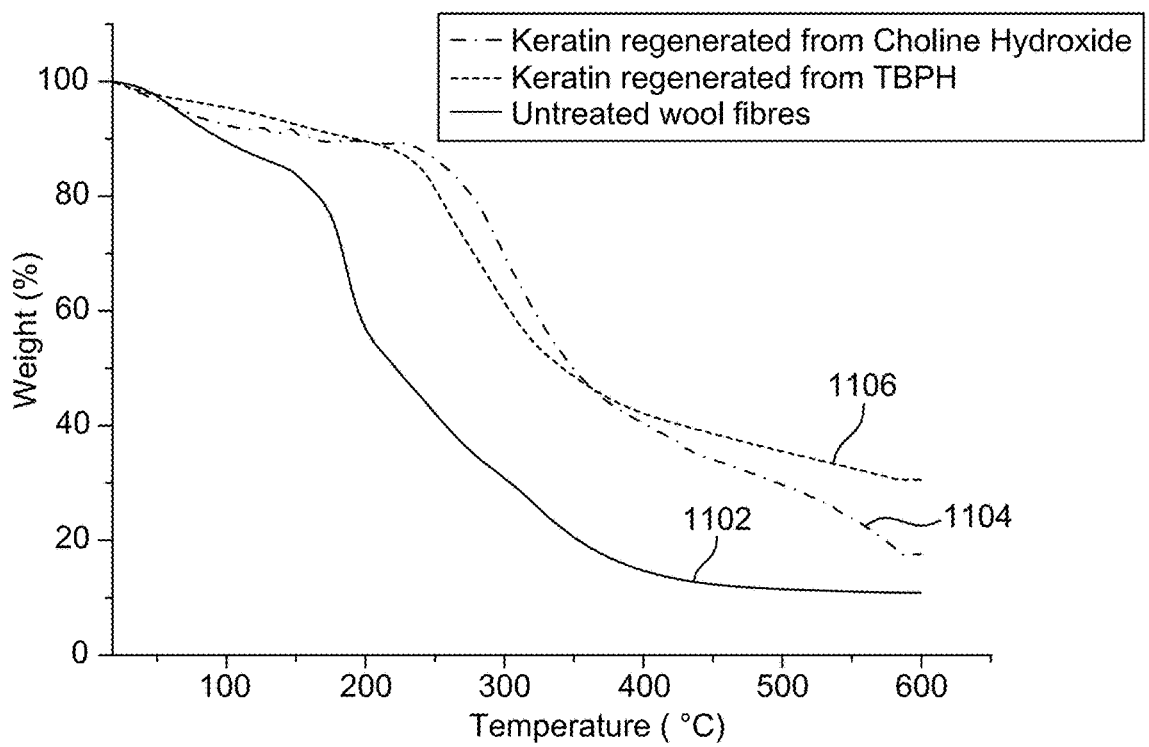
FIG. 11 illustrates thermogravimetric analysis (TGA) of the untreated wool fibers, the keratin regenerated from TBPH, and the keratin regenerated from choline hydroxide, according to certain embodiments.

FIG. 11 shows the TGA analysis of the untreated wool fibers, and the regenerated keratin was done in the temperature range of 20-600° C. The TGA curve showed prominent weight loss at two stages. There was a slow weight loss for both the untreated and extracted keratin up to 130 ° C. The first stage of weight loss was mainly attributed to the evaporation of water present in all keratin samples. A rapid weight loss was observed for the region between 200 and 500° C., mainly due to protein degradation. According to the previous reports, sulfur dioxide and hydrogen sulfide release occurred between 230 and 250° C. due to the breakage of disulfide bonds. The slightly higher thermal stability of the regenerated keratin might be due to the higher crystallinity compared to the untreated wool fibers. It was also observed that the keratin regenerated from the choline hydroxide showed better thermal resistance than that from TBPH. The better thermal stability might be related to the higher amount of β-sheet conformation as it has chains with more interactions between the molecules.

Example 15: SDS-PAGE

FIG. 12 illustrates an SDS-PAGE of the keratin extracted from TBPH (1202), choline hydroxide (1204), and untreated wool fibers (1206). To identify the molecular masses of the extracted keratin, SDS-PAGE was performed. Two clear protein bands between 75 KDa and 37 kDa were observed for the untreated clean wool samples. These bands correlate to the intermediate filament keratins (low sulfur) of the fiber cortex. Additionally, a series of low mass fractions (20 kDa-10 kDa) were observed, mainly derived from the matrix (high sulfur), as shown in FIG. 12.

The keratin extracted from ionic liquids treatment showed partial disappearance of some bands (37 kDa-77 kDa) and the appearance of some new bands between 20 and 30 kDa due to the partial fragmentation of the regenerated proteins. It was also observed that some low molecular mass (10 kDa-20 kDa) proteins were broken down into small fragments, resulting in the slightly weak appearance of bands in this region compared to the untreated keratin. These results were aligned to studies conducted with ionic liquid treatment or the superheated water system, which resulted in small protein fragments around 5 kDa.

Example 16: Recycling of Ionic Liquid

The ability of the ionic liquid to be recycled was an interesting property that makes the overall process of keratin extraction very economical and efficient. The ionic liquid of the present disclosure was recycled thrice using vacuum drying, and a yield of more than 94% was observed after recycling the ionic liquid for the third time.

The use of probe sonication was found to be effective in the rapid and efficient dissolution of wool fibers compared to conventional heating and stirring methods. It was observed that, as compared to choline hydroxide, TBPH showed a higher dissolution potential for keratin. Some parameters related to probe sonication, such as the initial loading of the sample, the volume of ionic liquid, the period of sonication, and the amplitude of the probe sonicator, were identified to efficiently allow the wool fibers dissolution in the shortest possible time. FTIR analysis showed that the regenerated keratin maintains the polypeptide backbone structure. The thermophysical effects of probe ultrasonication were further studied on the regenerated keratin using SEM and TGA. SEM analysis indicates that the compact structure of keratin was lost on interaction with the ionic liquids, and TGA showed higher thermal stability of the regenerated keratin compared to raw wool. SDS-PAGE analysis showed a clear protein band between 75 and 37 kDa and the appearance of some weak bands between 20 and 30 kDa indicating the effects of probe sonication, which resulted in broken small fragments of keratin. The impact of probe sonication technology on the final properties of regenerated keratin allows for quick and efficient conversion of keratinous-rich raw materials into bio-resin.

Numerous modifications and variations of the present disclosure are possible in light of the above teachings. It is therefore to be understood that within the scope of the appended claims, the invention may be practiced otherwise than as specifically described herein.

The invention claimed is:

1. A method for extracting keratin from wool fibers, comprising:
   treating the wool fibers in a solvent, washing and drying to form cleaned wool fibers;
   cutting the cleaned wool fibers and dispersing the cut cleaned wool fibers in a solution consisting of 30 wt. % to 50 wt. % tetrabutylphosphonium hydroxide and water to form a slurry;
   sonicating the slurry at a temperature of from 30° C. to 80° C. to form a first composition containing dissolved keratin;
   mixing the first composition with water to precipitate the keratin from the first composition; and
   separating and collecting the precipitated keratin from the first composition, washing, and drying to form the keratin,
   wherein the sonicating is conducted by a probe sonicator for 5 to 60 minutes.

2. The method of claim 1, wherein the cleaned wool fibers are present in the slurry at a concentration of 0.01 to 0.3 g/mL based on a total volume of the solution consisting of tetrabutylphosphonium hydroxide and water.

3. The method of claim 1, wherein the solvent is at least one selected from the group consisting of hexane, cyclohexane, hexanaphthene, toluene, benzene, butane, pentane, octane, nonane, dichloromethane, dichloroethane, chloroform, methanol, ethanol, propanol, butanol, dimethylformamide, dimethylacetamide, dimethylsulfoxide, tetrahydrofuran, and acetonitrile.

4. The method of claim 3, wherein the solvent comprises hexane and dichloromethane, and wherein a volume ratio of hexane to dichloromethane in the solvent is in a range of 10:1 to 1:10.

5. The method of claim 1, wherein the probe sonicator is capable of providing sonication energy at from 0.1 to 100 Hz.

6. The method of claim 1, wherein a weight of the keratin dissolved in the first composition is at least 50 wt. % of a total weight of the cut cleaned wool fibers dispersed in the solution consisting of tetrabutylphosphonium hydroxide and water.

7. The method of claim 1, wherein the keratin extracted from the wool fibers has an amorphous morphology and an average particle size of less than 1 micrometer (μm).

8. The method of claim 1, wherein the keratin extracted from the wool fibers has a first molecular weight band of about 30 to 80 kilodaltons (kDa), and a second molecular weight band of about 10 to 30 kDa.

9. The method of claim 1, wherein the keratin extracted from the wool fibers has peaks at 800 to 1100 centimeter inverse ($cm^{-1}$), 1250 to 1700 $cm^{-1}$, and 2700 to 3500 $cm^{-1}$ in a Fourier transform infrared spectrum (FT-IR).

10. The method of claim 1, wherein the keratin extracted from the wool fibers has a higher thermal stability compared to the raw wool fibers.

11. A method for extracting keratin from natural fibers, comprising:
    treating the natural fibers in a solvent, washing and drying to form cleaned natural fibers;
    cutting the cleaned natural fibers and dispersing the cut cleaned wool fibers in a solution consisting of tetrabutylphosphonium hydroxide and water to form a slurry;
    sonicating the slurry at a temperature of from 30° C. to 80° C. to form a first composition containing dissolved keratin;
    mixing the first composition with water to precipitate the keratin from the first composition; and
    separating and collecting the precipitated keratin from the first composition, washing, and drying to form the keratin.

12. The method of claim 11, wherein the natural fibers are selected from animal fibers, plant fibers, liberian fibers, leaf fibers, metal fibers, and silica fibers.

13. The method of claim 12, wherein the natural fibers are animal fibers which are selected from the group selected from silk, wool, and hair.

* * * * *